United States Patent [19]
Takahata et al.

[11] Patent Number: 4,870,589
[45] Date of Patent: Sep. 26, 1989

[54] MANAGEMENT APPARATUS FOR EQUIPMENT

[75] Inventors: Naomi Takahata, Yokohama; Takeshi Honjo, Kawasaki, both of Japan

[73] Assignee: Canon Kabushiki Kaisha, Tokyo, Japan

[21] Appl. No.: 153,558

[22] Filed: Feb. 4, 1988

Related U.S. Application Data

[63] Continuation of Ser. No. 828,257, Feb. 11, 1986, abandoned.

[30] Foreign Application Priority Data

| Feb. 13, 1985 | [JP] | Japan | 60-025702 |
| Feb. 13, 1985 | [JP] | Japan | 025703 |
| Feb. 13, 1985 | [JP] | Japan | 025710 |
| Feb. 13, 1985 | [JP] | Japan | 025711 |

[51] Int. Cl.$^4$ .............. G06F 15/22; G06F 15/36; G06F 11/20
[52] U.S. Cl. .............. 364/464.04; 235/380; 371/66
[58] Field of Search .............. 364/464.01, 466; 355/6, 355/14 C; 235/375, 380, 381; 371/14, 66

[56] References Cited

U.S. PATENT DOCUMENTS

| 3,917,924 | 11/1975 | Linne | 355/6 X |
| 3,977,873 | 12/1976 | Thornton | 355/6 |
| 4,102,492 | 7/1978 | Gold et al. | 235/375 |
| 4,229,794 | 10/1980 | Foster | 364/466 |
| 4,361,754 | 11/1982 | Hoskinson et al. | 235/381 |
| 4,408,119 | 10/1983 | Decavele | 235/381 X |
| 4,451,742 | 5/1984 | Aswell | 371/66 |
| 4,501,485 | 2/1985 | Tsudaka | 355/6 |
| 4,518,852 | 5/1985 | Stockburger et al. | 235/381 |

FOREIGN PATENT DOCUMENTS

| 142399 | 6/1980 | Fed. Rep. of Germany | 371/66 |
| 56-50342 | 5/1981 | Japan | 355/6 |
| 58-146099 | 8/1983 | Japan | 371/14 |
| 59-24858 | 2/1984 | Japan | 355/6 |

Primary Examiner—Felix D. Gruber
Attorney, Agent, or Firm—Fitzpatrick, Cella, Harper & Scinto

[57] ABSTRACT

A management apparatus for equipment such as a copying machine has cards recording section data or the like, a card controller for reading the data from a card when the card is inserted and used when the number of sections using the machine is relatively large, a key counter for counting the number of copies produced in each section used when the number of sections using the machine is small, a control/display section for displaying the data read from the card and other data, and a microcomputer for controlling the operation of the card controller. The number of copies produced by each section, the total number of copies produced by the machine and corresponding amounts of money can be easily checked. The upper limit for use of the machine by each section can be set and displayed in desired units, the use of the machine by a particular section can be prohibited, or such prohibition can be released as needed. The management data can be easily erased, and the life of the battery for backing up a memory storing the management data is prolonged.

31 Claims, 36 Drawing Sheets

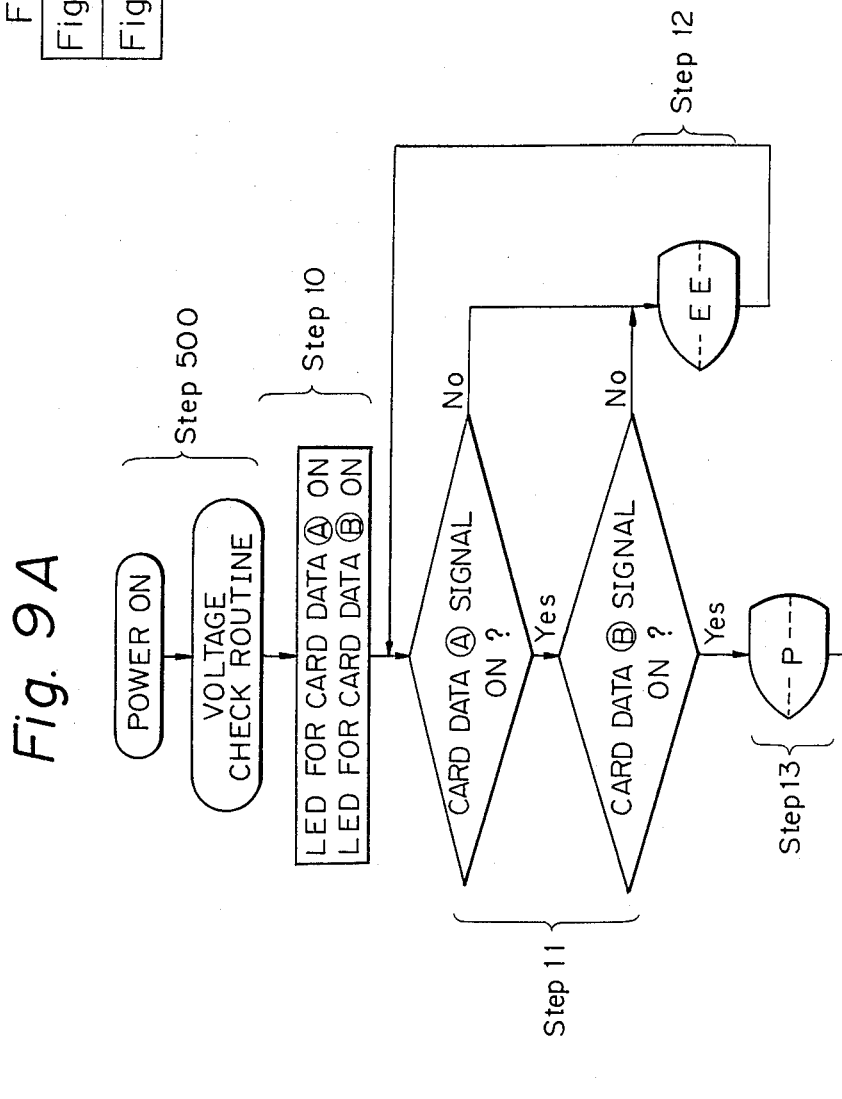

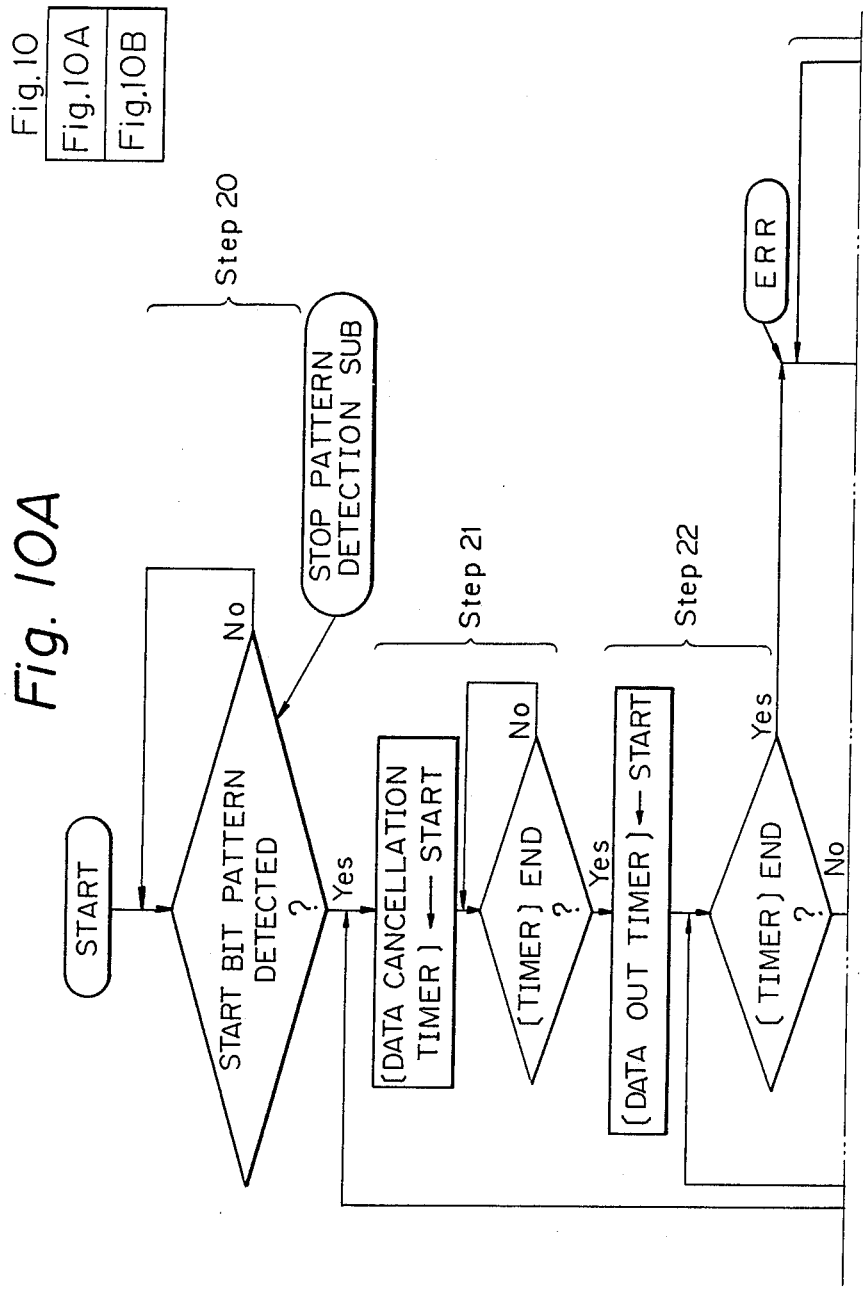

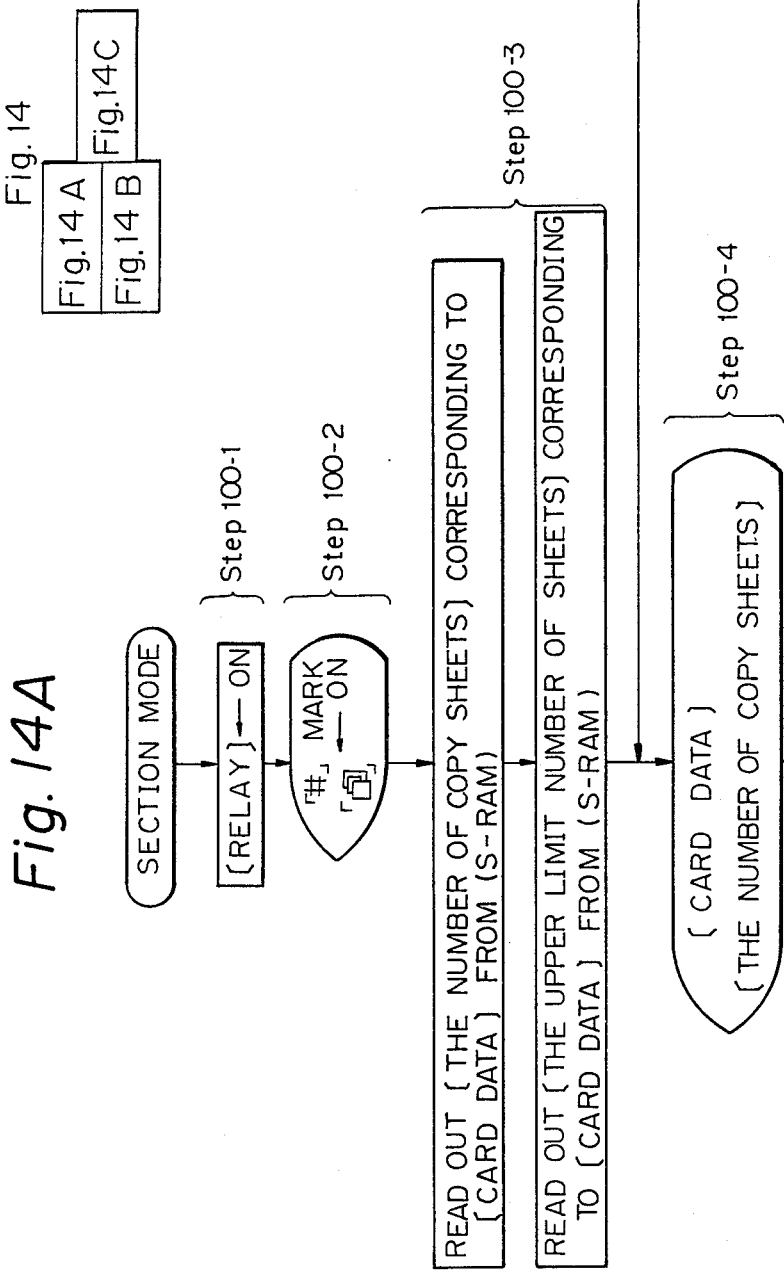

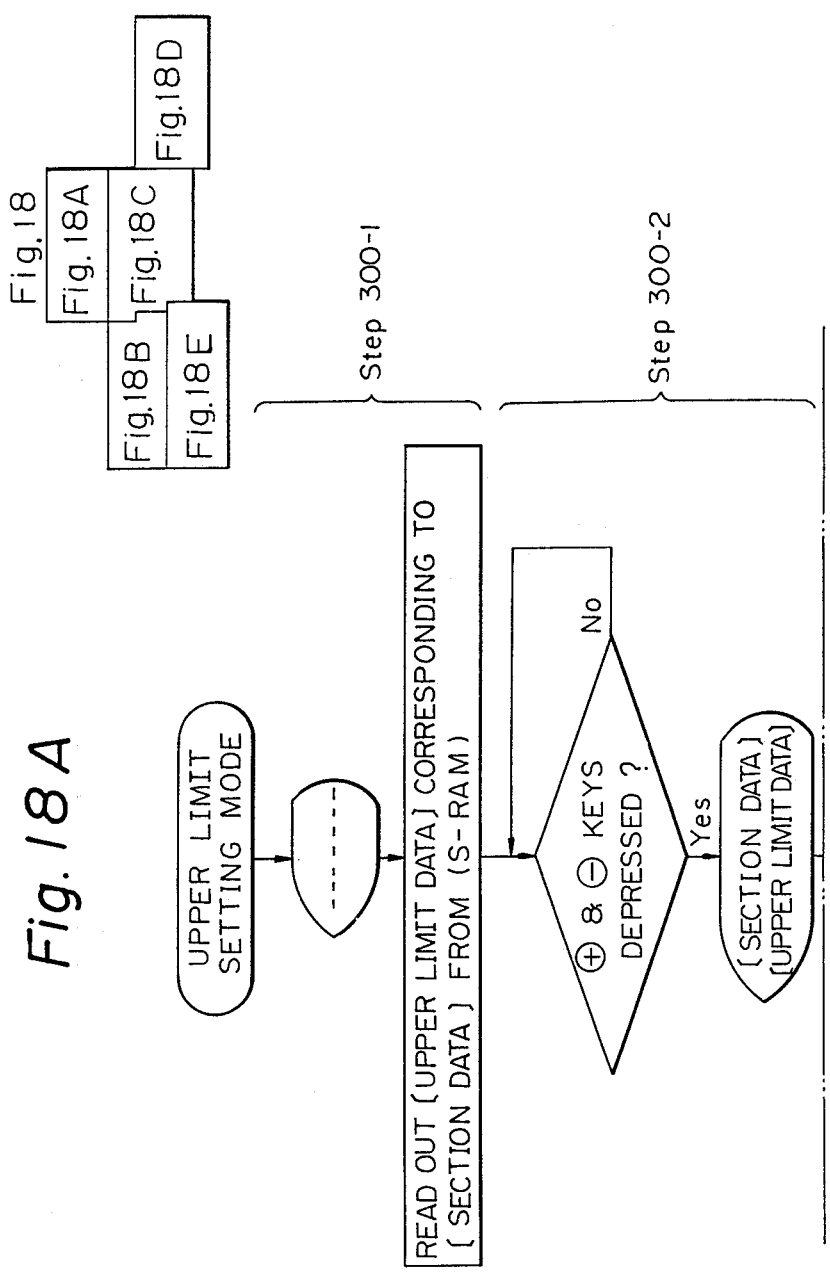

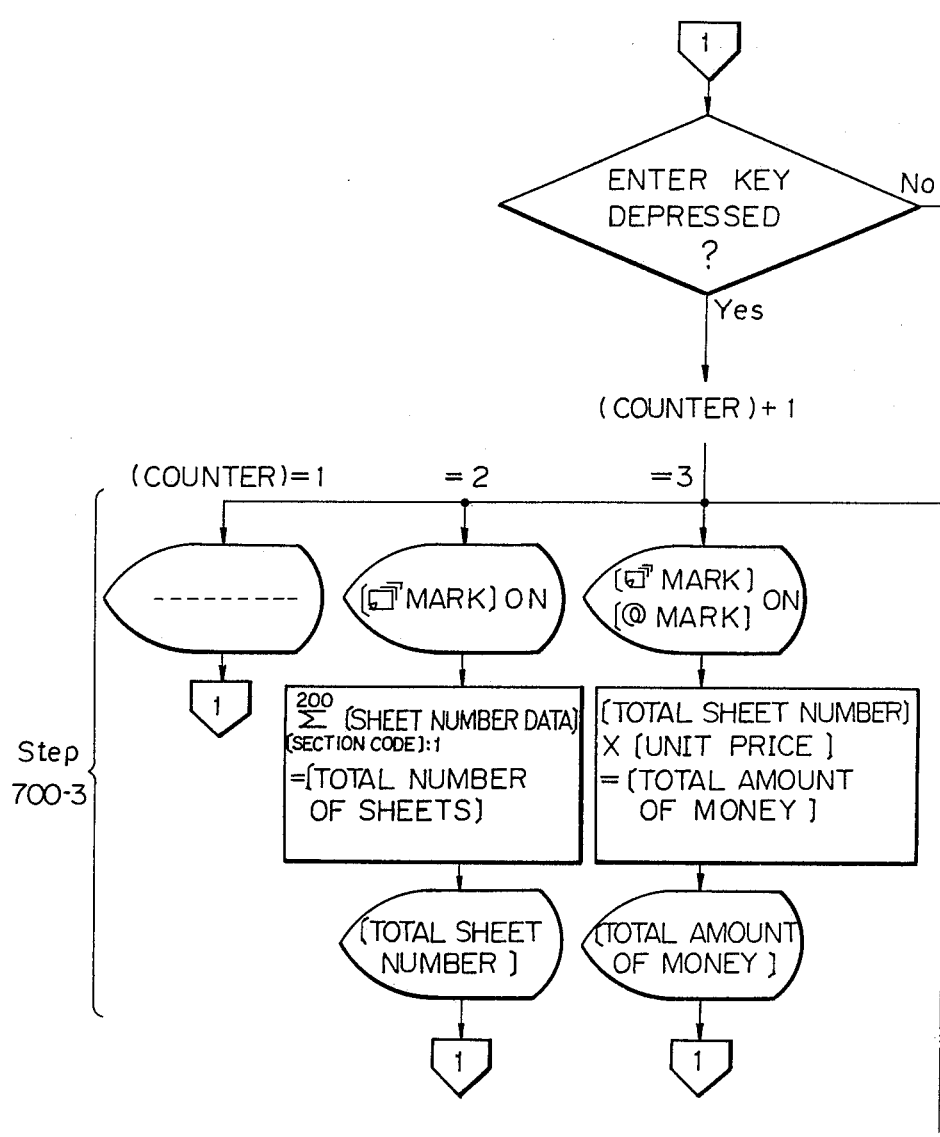

(a)

(b)

(c)

(d)

(e)

MANAGEMENT APPARATUS FOR EQUIPMENT

This application is a continuation of application Ser. No. 828,257 filed Feb. 11, 1986, now abandoned.

BACKGROUND OF THE INVENTION

1. Field of the Invention

The present invention relates to an apparatus for managing the amount of use of equipment, such as the number of copies produced in a copying machine or the number of times communication is performed by facsimile equipment, using a recording medium storing predetermined data.

2. Description of the Prior Art

In a conventional apparatus of the type described above, mechanical counters (so-called key counters) assigned to respective sections are provided in a means for managing, for instance, the number of copies produced for use in each section. When an operator uses the copying machine, he couples the counter of his section to the machine so as to enable the copying machine. Thus, the number of copies produced in each operation is registered into the counter.

However, when a manager wishes to determine the total number of copies produced by the copying machine, he must physically travel to all the sections and confirm the number of copies made by each section, since each of the counters indicating the associated number of copies is independently kept in an associated section. The labor and effort for this are considerable. In addition, since the counters themselves are relatively expensive, the above apparatus results in an expensive system when the number of sections is large. The apparatus is also difficult to handle due to its heavy weight and specific shape.

In view of this problem, another conventional apparatus has also been proposed. In this apparatus, a section card recording data identifying a section is coupled to enable a copying machine. A memory is provided in the copying machine to store the number of copies produced by each section. When a manager wants to determine the total number of copies produced by the machine and the number of copies produced by each section, he inserts a specific card recording a predetermined function card into the machine to check them.

As a specific application of this type of management apparatus, an optical sensor is used to read, for example, section code data from an optical card having a clock hole and a data hole, and to enable a copying machine. In such an apparatus, when the card is pulled out halfway while it is inserted into the apparatus, data may be read erroneously. In order to prevent this, an additional sensor must be provided to detect that the card is completely inserted into the apparatus. This results in a complex and expensive apparatus.

In addition, in this type of apparatus, the section code is read when the card is inserted. Therefore, if a card has been inserted when the power is turned off, the section code of the inserted card cannot be identified and the user must re-insert the card after power is turned on. When the card must be re-inserted, the apparatus simply provides an alarm, and the user may not be able to determine what must be done.

In such an apparatus, the number of copies produced by each section, the total number of copies produced, and the unit price of a copy previously set are stored. The number of copies produced by each section and the total number of copies produced by the machine, and the corresponding cost or amount of money are sequentially displayed or printed.

When a unit price of a copy is set, the unit price of a copy is normally 5 to 50 yen and the unit of sequential display is 0.5 yen, providing an incremental display within a range of 0.50 to 50.0. Considering this in terms of dollars, when the rate is assumed to be $1=240 yen, an incremental display within a range of 0.02 to 0.21 must be provided. When the franc rate is considered to be F1=30 yen, an incremental display within a range of 0.01 to 1.70 must be provided. In other words, at least four digits are required for setting a unit price for copies. In a conventional 4-digit setting means, a rotary switch is provided for each digit, and each digit is set by the position of the rotary switch. If the four rotary switches must be provided at positions easily accessible to the operator, the apparatus becomes expensive and its installation location is limited. Moreover, since anybody other than the person responsible for management of the machine can set or change the unit price, the person responsible for management of the machine may count the total number of copies produced and the like without knowing that the unit price has been erroneously set by somebody else.

In some cases, the number of copies which can be produced for use in a specific section of a company within a given period of time must be limited, or the use of the machine itself by some sections may have to be prohibited. This must be manageable by a person responsible for management thereof. In order to allow him to do so, still another card for allowing him to limit or prohibit the use of the copying machine by a given section is required, thus increasing the total number of cards in an overall system.

In some apparatus of this type, the unit price of copies and other data must be stored in addition to the number of copies produced.

In such a case, when the person responsible for management clears the data of the number of copies, he must clear all the data contents in the memory or clear the data for each section one by one. This results in poor operability and may also result in accidental erasure of data which is actually wanted.

According to a technique used in this type of apparatus, when the person responsible for management wants to determine the number of copies and the like, he inserts a special card into the machine or keys in ID data or the like to cause a display unit to display the desired data. However, once the display unit starts to display of the number of copies produced of each section, for example, the copying machine can not be used for a copying operation until all the data has been displayed.

In some cases, data such as the unit price of copies, total amount of money spent for copying in each section, and the total amount of money for copying spent by all sections must be managed. In such a case, if special displays for this purpose are included in the machine, the machine becomes expensive again.

It is also known to provide a back-up battery in order to allow a memory (RAM) to hold data even when the power is turned off. In this case, the battery voltage is monitored. When the monitored voltage becomes lower than a back-up voltage, this is signalled to the user in order to prevent loss of data.

When the battery voltage is monitored, a comparator is used to compare the battery voltage with a reference voltage. However, this results in flow of a source current, thereby shortening the life of a battery.

An apparatus of the type described above is cost-effective when the total number of sections which use a single copying machine is large. However, when the total number of sections is small, a method of using mechanical counters results in less cost. In view of this, there is a strong demand for key counters.

Copying machines are normally designated exclusively either for coupling with counters or for receiving cards. Thus, if a counter is to be coupled to a machine which only receives cards or vice versa, a special cable must be used. This results in complex and costly installation.

SUMMARY OF THE INVENTION

The present invention has been made in consideration of this and its object is to provide an apparatus for managing the amount of use of equipment.

It is another object of the present invention to provide a management apparatus for equipment, which has a simple configuration, low cost, and high reliability.

It is still another object of the present invention to provide a management apparatus for equipment, which has an improved operability.

It is still another object of the present invention to provide a management apparatus for equipment, which manages in accordance with data read out from a recording medium storing predetermined data and which prevents accidental detection the reading of data.

It is still another object of the present invention to provide a management apparatus for equipment, which can prevent erroneous calculation of the total amount of use of the equipment.

It is still another object of the present invention to provide a management apparatus for equipment, which allows setting of a unit price in a plurality of units.

It is still another object of the present invention to provide a management apparatus for equipment, which allows arbitrary setting of an upper limit for use by each section with a simple configuration.

It is still another object of the present invention to provide a management apparatus for equipment, which can prevent accidental erasure of data by the user.

It is still another object of the present invention to provide a management apparatus for equipment, which provides management display which is easy to see with a simple configuration.

It is still another object of the present invention to provide a management apparatus for equipment, which allows the prolonging of life of a back-up battery for a memory means storing management data of the equipment.

It is still another object of the present invention to provide a management apparatus for equipment, which allows the use of a plurality of types management means without requiring the use of a special cable or the like.

The above and other objects, features and advantages of the present invention will become apparent from the following description and the accompanying drawings.

BRIEF DESCRIPTION OF THE DRAWINGS

FIGS. 2A to 2D show various function cards;

FIG. 3-1 is a perspective view showing the outer appearance of a socket;

FIG. 3-2 is a diagram showing connection of a socket to equipment;

FIG. 6-1 is a diagram showing the construction of a reader in the card controller;

FIG. 6-2 is a circuit diagram showing electrical connections of the reader shown in FIG. 6-1;

FIG. 8-1 is a perspective view showing the outer appearance of a key counter;

FIG. 8-2 is a diagram showing the internal configuration of the key counter in FIG. 8-1;

FIGS. 17, 19, 21 and 25 are diagrams showing displays at a display section.

DETAILED DESCRIPTION OF THE PREFERRED EMBODIMENTS

The preferred embodiments of the present invention will now be described with reference to the accompanying drawings.

Figure 1:
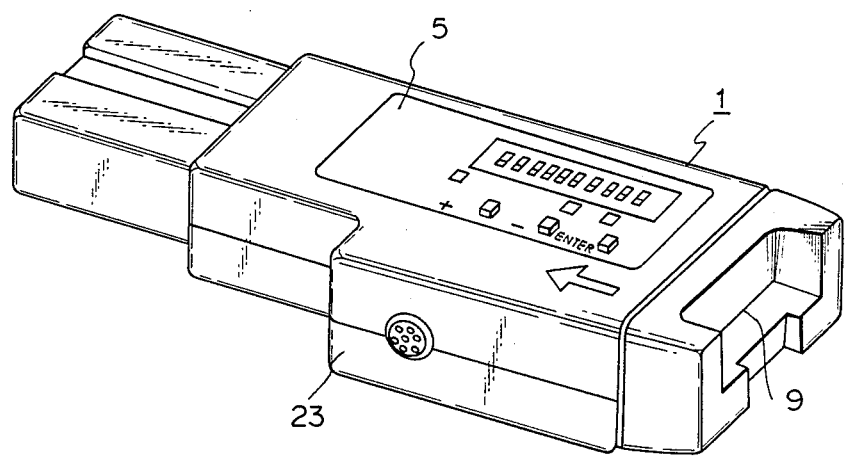
FIG. 1 is a perspective view of a card controller according to an embodiment of the present invention.
Figures 1, 3:
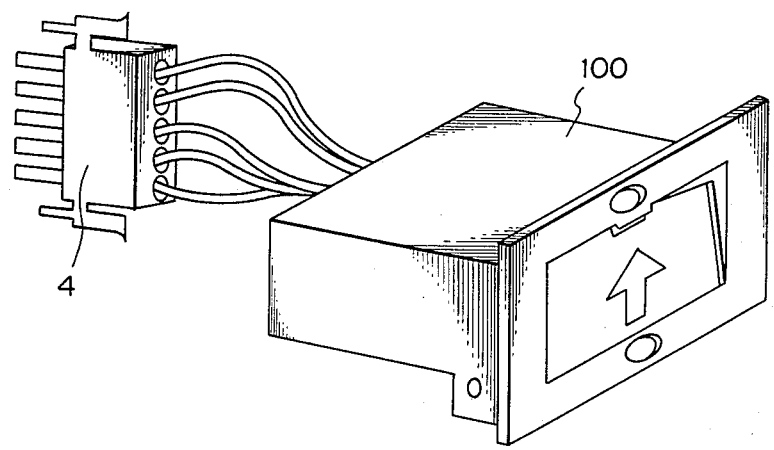
Figure 2:
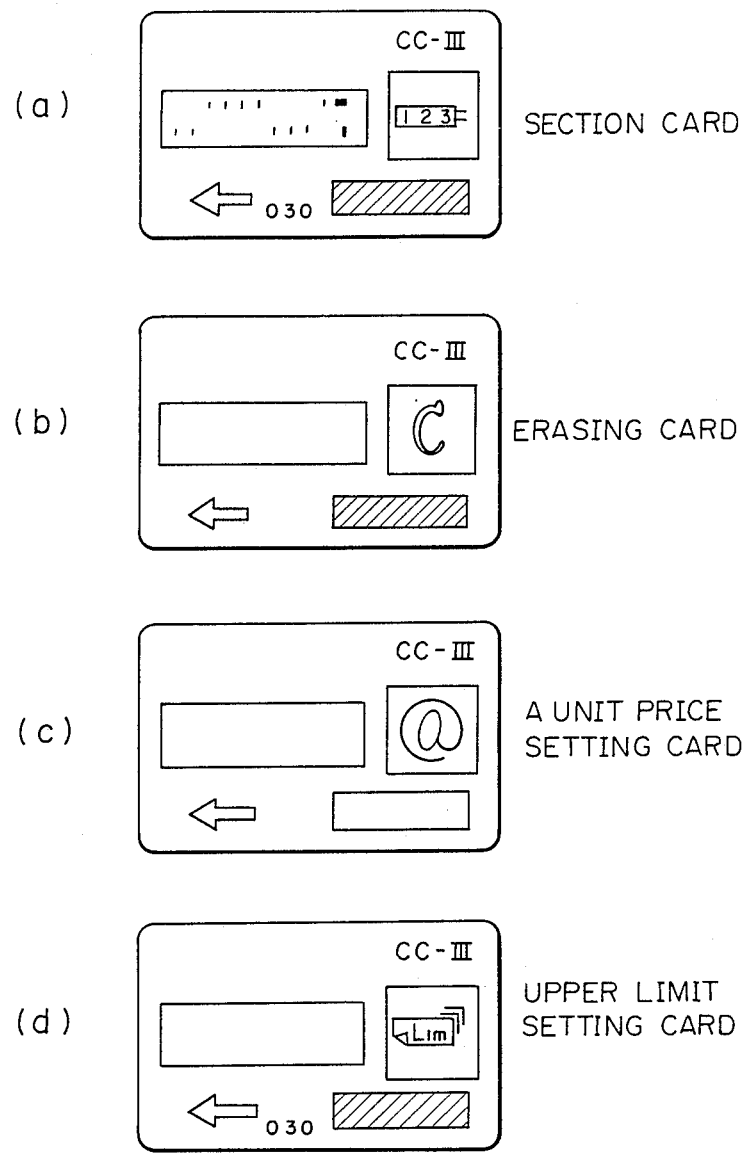
Figures 2, 3:
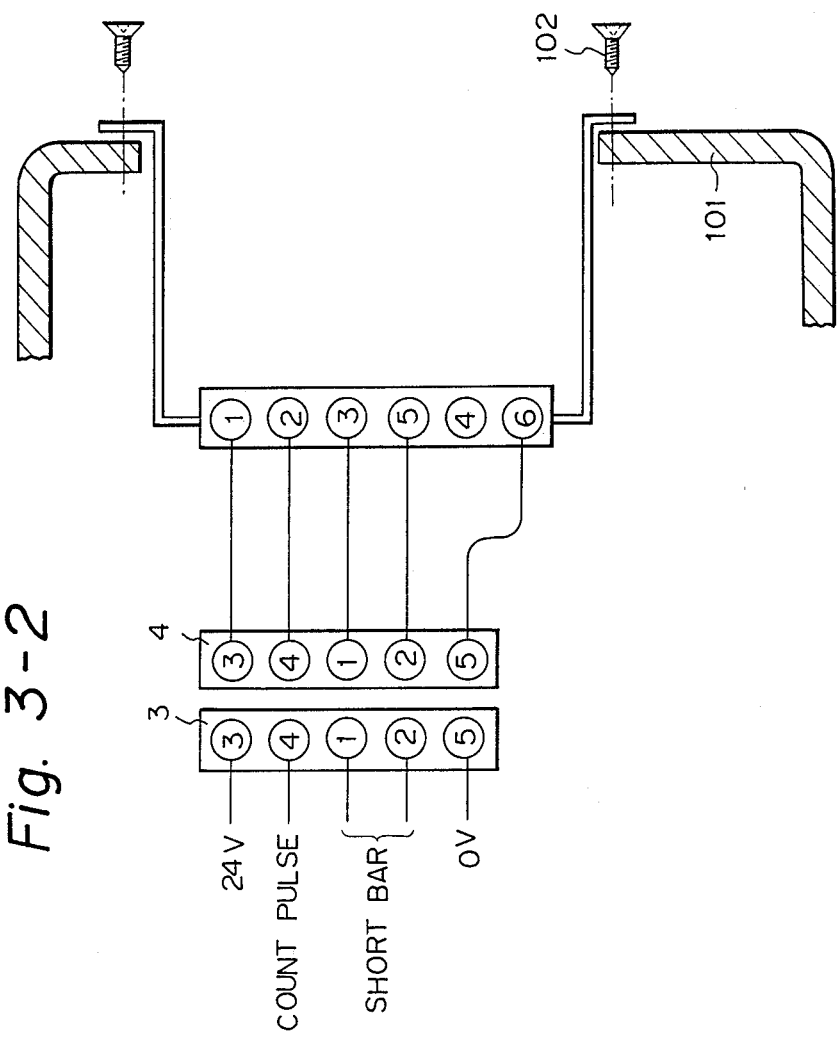

FIG. 1 is a perspective view showing the outer appearance of a management apparatus for equipment (to be referred to as a card controller hereinafter) according to an embodiment of the present invention. The card controller has a card controller housing 1, a control/display section 5, an insertion port 9 for receiving cards such as those shown in FIGS. 2A to 2D, and a connector 23 for connection with a printer. FIG. 3-1 is a perspective view showing a receiving unit member (to be referred to as a socket hereinafter) when the card controller 1 is installed in equipment such as a copying machine. A connector 4 is connected to a socket 100. As shown in FIG. 3-2, the socket 100 is mechanically fixed to a casing 101 with screws 102. Electrically, the connector in the equipment and the connector 4 connected to the socket 100 are coupled, the card controller 1 is inserted into the socket 100, and the power of the equipment is turned on. Then, any one of cards are shown in FIGS. 2A to 2D can be inserted.

Figure 4:
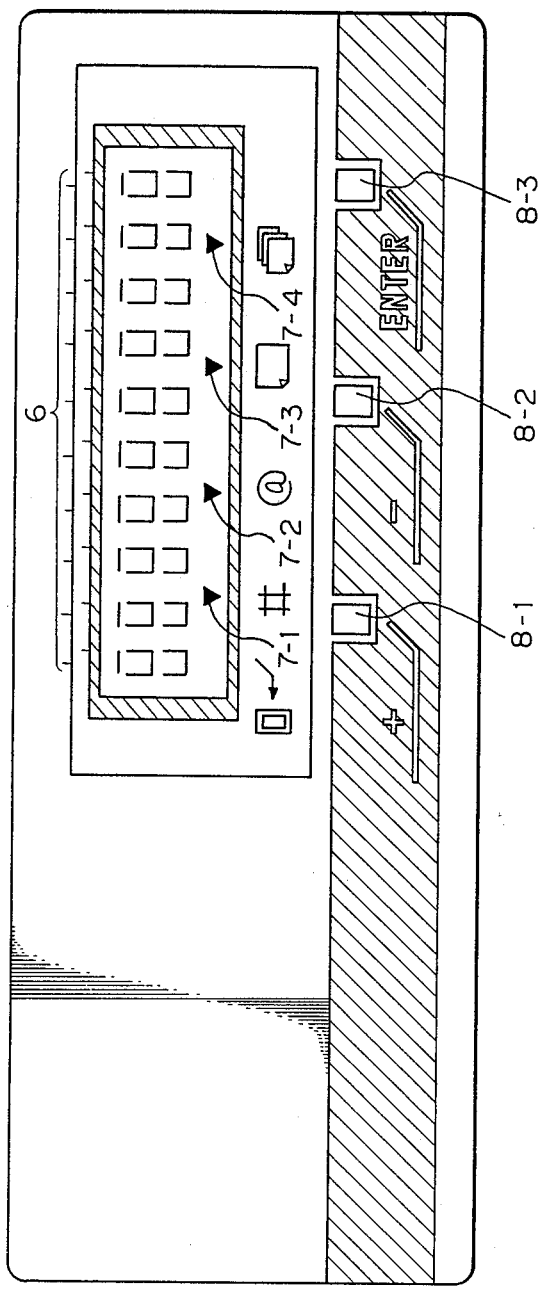
FIG. 4 is a diagram showing a control/display section of the card controller.

FIG. 4 is an enlarged view of the control/ display section 5 shown in FIG. 1. The section 5 has a 10-digit numeral display 6, character pattern indication marks 7-1 to 7-4, and three operation key switches 8−1 to 8−3 (+, − and ENTER switches). When the keys are properly operated and one of the section card, erasing card, unit price setting card, and upper limit setting card as shown in FIGS. 2A to 2D, respectively, is inserted, the following functions can be performed.

The operations/functions of the equipment corresponding to the function cards shown in FIGS. 2A to 2D will be described below.

(1) Function for totalling the number of copies produced by each section allowed to use the equipment When the section card (having optical information identifying a section) shown in FIG. 2A is inserted, equipment (a copying machine in this case) is enabled. Displays 6 and 7 shown in FIG. 4 display the card section number and the number of copy sheets. The machine is kept enabled until the section card is pulled out.

(2) Erasing function

When the erasing card as shown in FIG. 2B is inserted and the key switch 8-3 shown in FIG. 4 is depressed, the stored contents are erased. However, note that the preset upper limits and the preset unit price to be described later are not erased in this case.

(3) Function for setting unit price

When the unit price setting card shown in FIG. 2C is inserted and the key switches 8-1 to 8-3 shown in FIG. 4 are operated appropriately, the unit price can be set.

(4) Function of setting upper limit

When the upper limit setting card shown in FIG. 2D is inserted and the key switches 8-1 to 8-3 are operated appropriately, the upper limit of the number of copy sheets which can be produced in each section can be set. In addition, when the upper limit is set at a value less than the current number (indicating the number of copy sheets which have already been produced in that section), further use of the machine by this section is prohibited.

Figure 5:
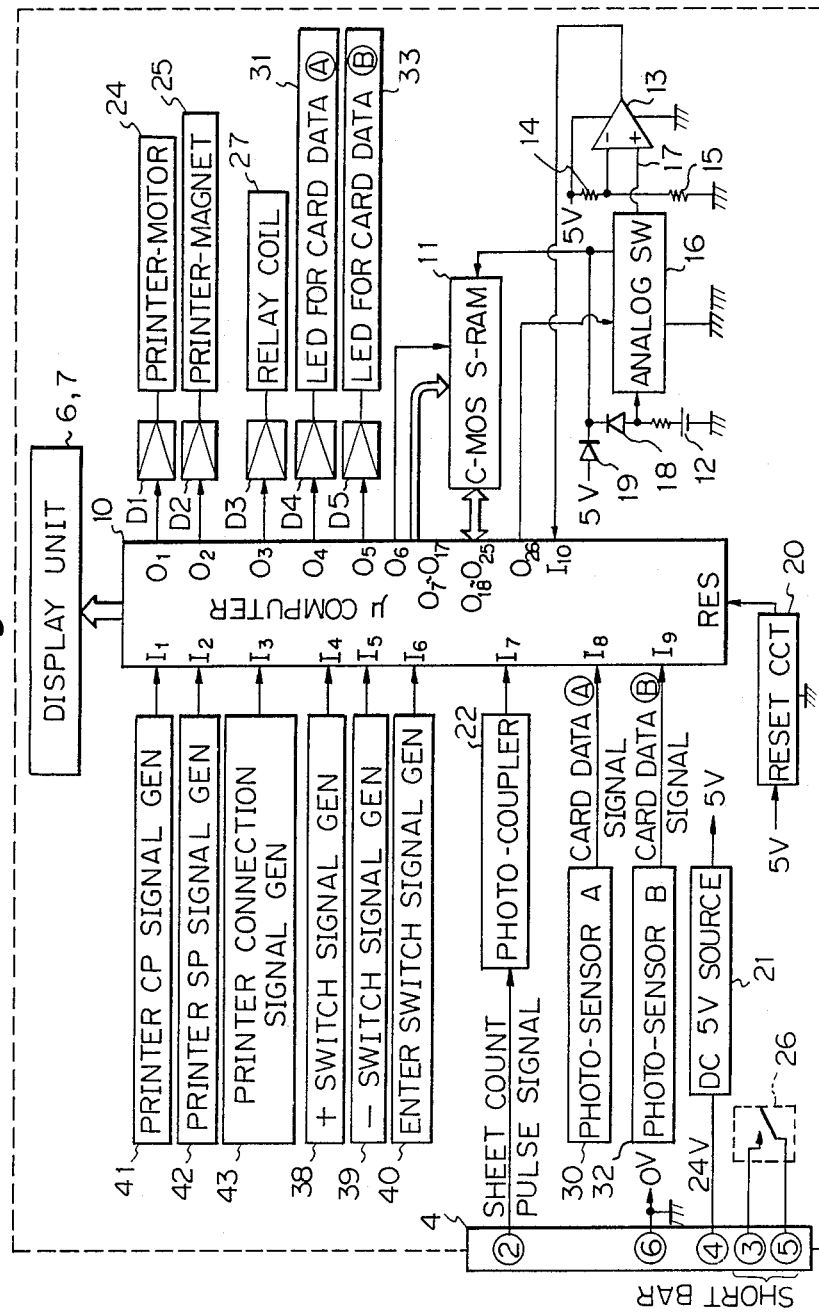
FIG. 5 is a block diagram showing a control section of the card controller.
Figures 1, 6:
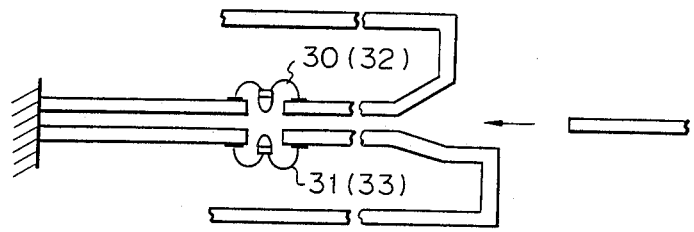
Figures 2, 6:
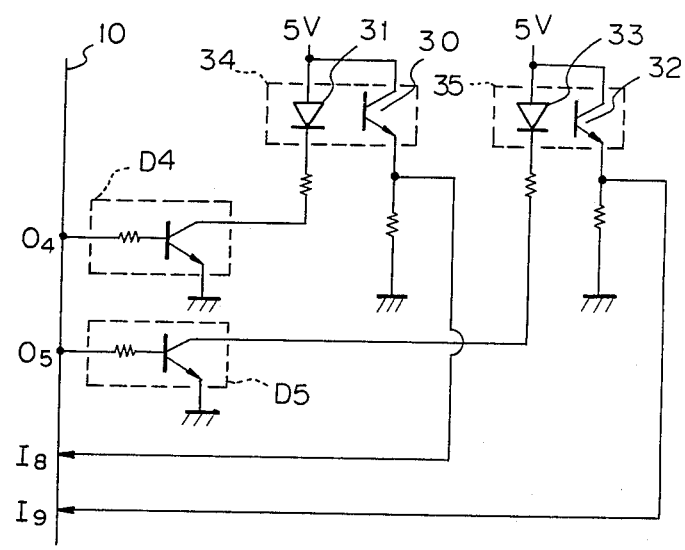

FIG. 5 is a block diagram showing a control section of the card controller 1. The control section has a microcomputer 10, an SRAM 11 for storing sum data, a back-up battery 12 for holding the storage contents of the SRAM 11 when the power of the machine is turned off, and a comparator 13 for comparing the voltage of the battery 12 with a reference voltage set by resistors 14 and 15. An analog switch 16 has an analog gate function for detecting the voltage of the battery 12 immediately after the power of the machine is turned off and immediately after a card is completely inserted. Only when an output signal from an output port 026 of the microcomputer 10 is produced, the analog switch 16 turned on. The output from the analog switch 16 is supplied to the comparator 13 through its input line 17 and is compared with the reference voltage. This comparison is performed so as to minimize the source current of the battery 12 and to assure a maximum life of the battery 12.

Diodes 18 and 19 prevent the flow of current to the battery 12 upon turning on of the machine and to the elements other than the analog switch 16 and the SRAM 11 upon turning off of the machine. A reset circuit 20 is used to reset the microcomputer 10 when the power of the machine is turned on. A converter 21 converts a voltage of 24 V from the machine to a voltage of 5 V. A photo-coupler 22 serves to change a sheet count pulse signal from the machine into a voltage signal of 5 V and to remove line noise. When a printer (not shown) is connected to the connector 23 shown in FIG. 1, drivers D1 and D2 drive a printer motor 24 and a printer magnet 25 for summing and printing data. A driver D3 serves to turn on a relay coil 27. The relay coil 27 serves to enable the machine by short-circuiting lines 3 to 5 with a relay contact 26. Drivers D4 to D5 are for LEDs 28 and 29 which are respectively for card data A and B. FIGS. 6-1, 6-2 and 7 show the configuration of the diodes D4 and D5. Two types of perforation data in a card are detected by photointerrupters 34 and 35 consisting of phototransistors 30 and 32 and LEDs 31 and 33. Signals from a card data A signal generator 36 and a card data B signal generator 37 are supplied to input ports I8 and I9. Circuits 38, 39 and 40 generate a +switch signal, a −switch signal and an ENTER switch signal when the keys 8-1 to 8-3, respectively, shown in FIG. 4 are depressed. These signals are supplied to input ports I4 to I6. A printer CP signal 41, a printer SP signal 42 and a printer connection signal 43 are all required for normal operation of the printer described above. When the number of sheets for each section and total number for all sections are calculated and printed, connection with the printer is detected by detecting the printer connection signal 43. Then, the printer motor 24 is turned on. The printer magnet 25 is turned on to perform sequential printing while monitoring the printer CP signal 41 generated for each printing and the printer SP signal 42 generated at the home position.

Figures 1, 8:
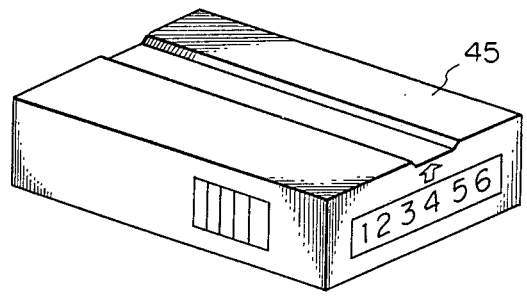
Figures 2, 8:
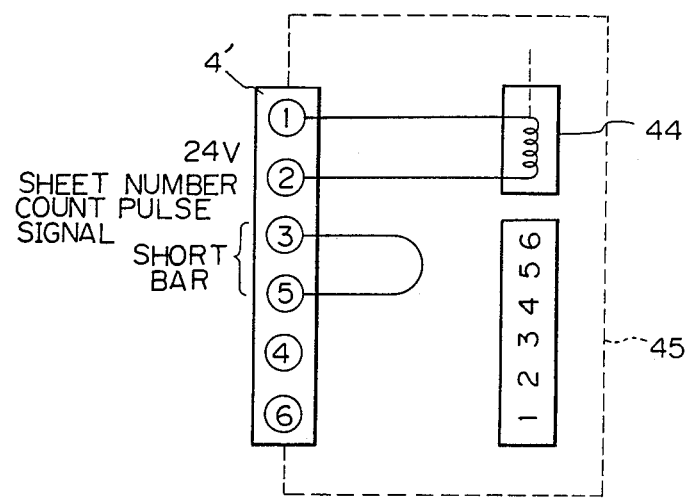

In this embodiment, a key counter mechanically storing the number of sheets can also be connected to the socket 100. FIG. 8-1 is a perspective view showing the outer appearance of the key counter. FIG. 8-2 shows the internal configuration of the key counter. A key counter 45 counts and holds the number of sheets by mechanically pivoting a cam by an electromagnet 44. A connector 4' in FIG. 8-2 corresponds to the connector 4 shown in FIG. 5 and has a power source, and sheet count pulse signal and short bar terminals for enabling the machine connected in the same manner. When the card controller shown in FIG. 5 is connected to the machine and a section card is inserted in the socket 100 shown in FIGS. 3-1 and 3-2, the relay contact 26 is turned on, the lines 3 and 5 of the connector 4 are short-circuited and the machine is enabled. When the key counter 45 is to be connected, the lines 3 and 5 of the connector 4' are short-circuited in advance. When the key counter 45 is inserted into the socket 100 shown in FIGS. 3-1 and 3-2, the machine is enabled. In this manner, the socket 100 can be used either with the card controller 1 or the key counter 45. When the number of sections to be managed is small, key counters can be used, and otherwise, the card controller can be used. This provides an inexpensive system.

FIGS. 9 to 16, 18, 20, and 22 to 24 show flow charts according to the embodiment of the present invention. A detailed description will be made with reference to the flow charts.

Figure 9B:
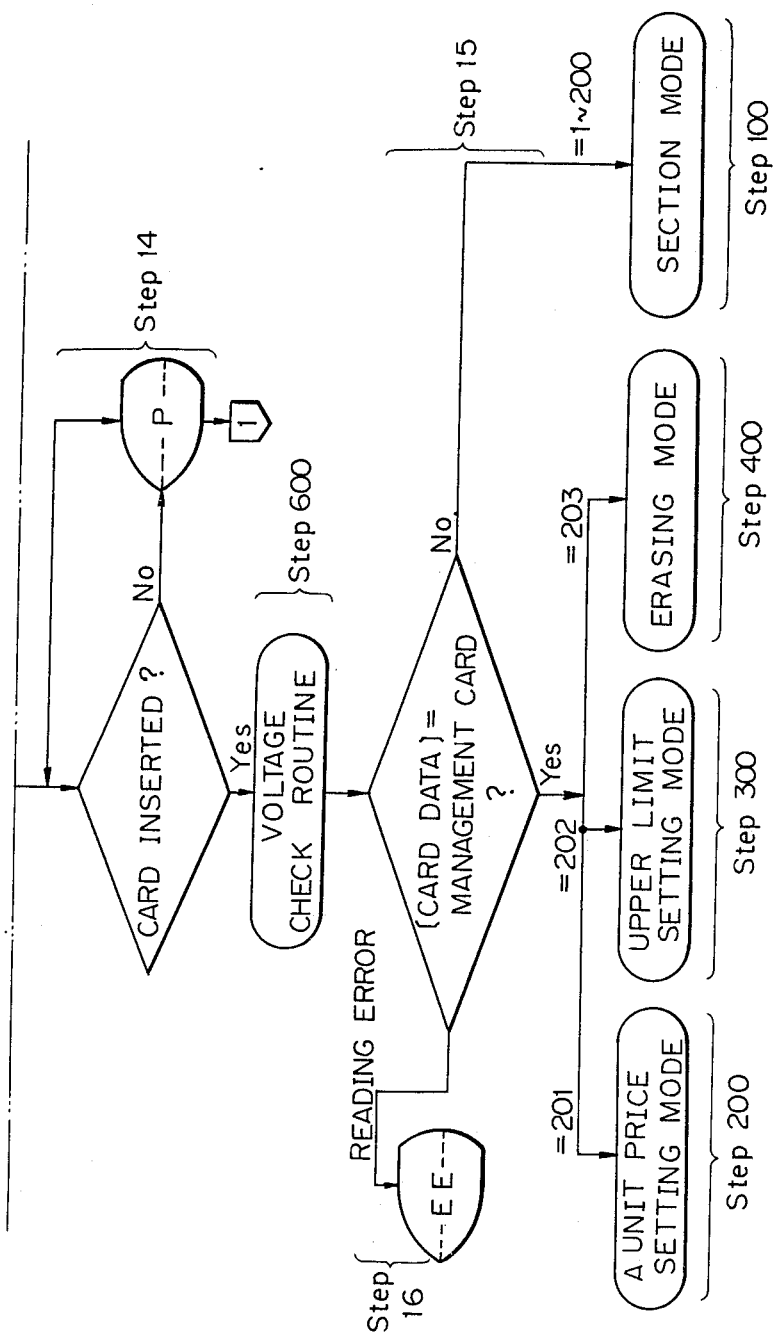
FIGS. 9 to 16, 18, 20, and 22 to 24 are flow charts according to the embodiment of the present invention.
Figure 10B:
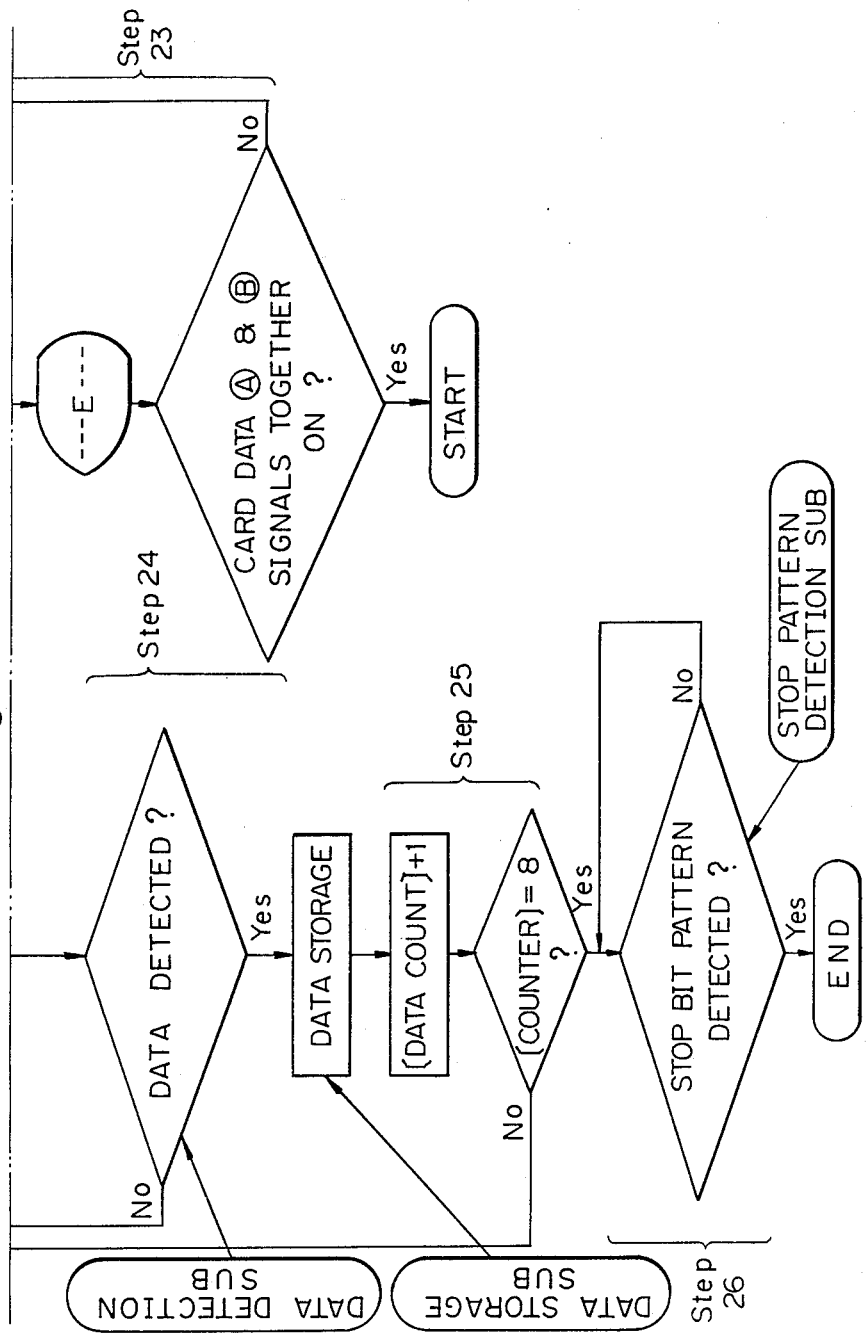

First, as shown in FIG. 9, when the power is turned on, the voltage check routine for the back-up battery 12 for backing up the SRAM 11 is executed (step 500). It is checked to determine if a card is inserted. This checking is performed for the following reason. If the card controller is powered by equipment, a copying machine in this case, when the power of the machine is turned off, insertion of a card cannot be detected. Therefore, when power of the machine is turned on, it is always detected if a card is inserted. If a card is detected to have been inserted, the user is requested to re-insert the card. In step 10 in FIG. 9, the card data A LED 31 and the card data B LED 33 are turned on, and the detection by the photosensors 30 and 32 is started. In step 20, the ON/OFF states of the signal card data A and B signals from the photosensors 30 and 32 corresponding to the respective LEDs 31 and 33 are discriminated. If a card is inserted, one or both of the A and B signals is or are turned off by the card. In this case, in step 21, a display "--EE--" is provided to prompt the user to re-insert the card. In step 11, the A and B signals are monitored. Only when both the A and B signals are turned on, it is determined that a card has been pulled out. In step 13, a display "--P--" is provided, and the flow advances to step 14.

When a card has been inserted, the voltage check routine for the back-up battery 12 for the SRAM 11 is executed (step 600), and the flow advances to step 14. In step 14, the type of the inserted card is discriminated. If no card is inserted, a display "--P--" is provided (step 14). When a card is inserted, the card data is read, and the presence of a management card or of a section card is determined in accordance with the read data (step 15). When the card is determined to be a management card, data is 201 to 203. The processing in the unit price setting mode (step 200), the upper limit setting mode (step 300), and the erasing mode (step 400) is executed. When the card is detected to be a section card, data is 1 to 200. In this case, processing in the section mode (step 100) is performed (step 20). When an error occurs upon insertion of a card, a display "--EE--" is provided (step 16).

Card reading in step 14 will be described in detail with reference to the flow charts shown in FIGS. 10 to 13.

Figure 7:
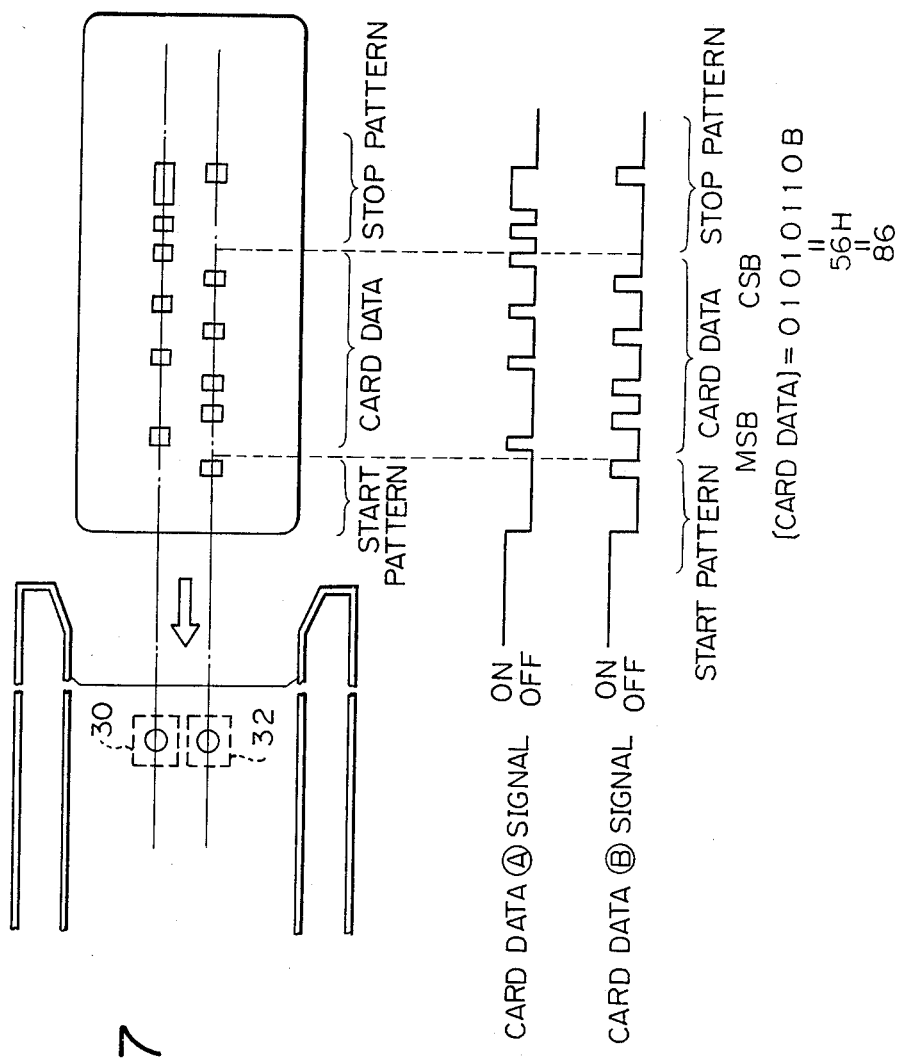
FIG. 7 is a diagram showing the read operation of data recorded on a card.

Referring to FIG. 7, the card is inserted in a direction indicated by an arrow. The card has holes corresponding to a start pattern, card data and a stop pattern. The holes of the card are detected by the card data A and B signals. In this embodiment, the start and stop patterns are always different and do not allow reading of the card data unless they are read in predetermined order. In the flow chart shown in FIG. 10, the start pattern to be described later is detected in step 20. When the start pattern is detected, data reading is performed in steps 21 to 25. Data reading is performed only when the card is inserted at a speed within a predetermined range. Otherwise, an error is displayed, and the data is cancelled. More specifically, in step 21, in order to cancel data if the card is inserted too fast, a data cancel timer is checked. In step 22, in order to cancel data if the card is inserted too slow, a data out timer is checked. If data cannot be detected even after the timer ends in step 22, a display "--E--" is provided in step 23. The user is instructed to re-insert the card, and the machine waits until the card is pulled out and re-inserted.

When data is detected, the data detection/ storage to be described later is performed in step 24. Then, the data counter is incremented by one in step 25. Data reading in steps 21 to 28 is performed until the counter reaches 8, i.e., until 8 bits of the card data end.

In step 26, detection of a stop pattern detection to be described is performed. When the stop pattern is detected, reading of the card data ends.

Figure 11:
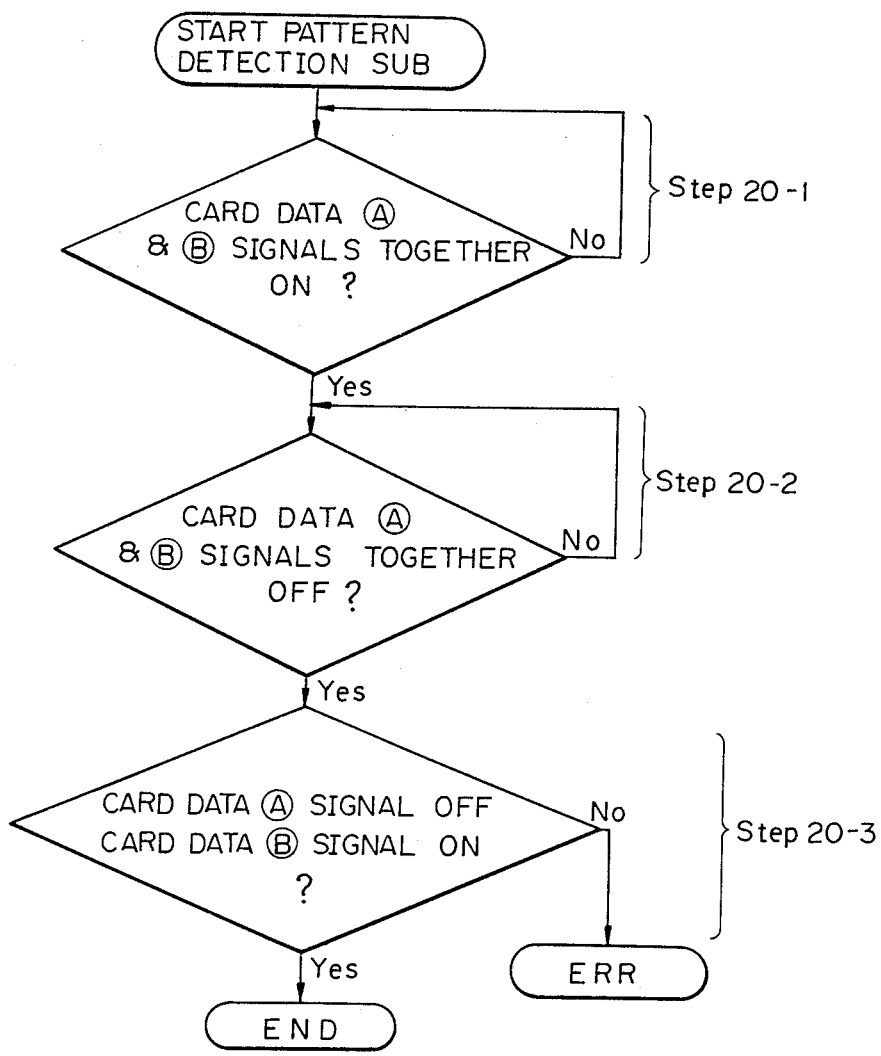

FIG. 11 is a detailed flow chart of detection of the start pattern. The start pattern shown in FIG. 7 is detected in the following manner. In step 20-1, it is checked if the card data A and B signals are both ON, i.e., if the card has not been inserted. In step 20-2, it is checked if the A and B signals are both off, i.e., if the leading end of the card has been inserted. In step 20-3, it is checked if only the B signal is ON, i.e., if the hole corresponding to the B signal is detected. When another signal is detected to be ON in step 20-3, the start pattern is not detected and an error is generated.

Figure 12:
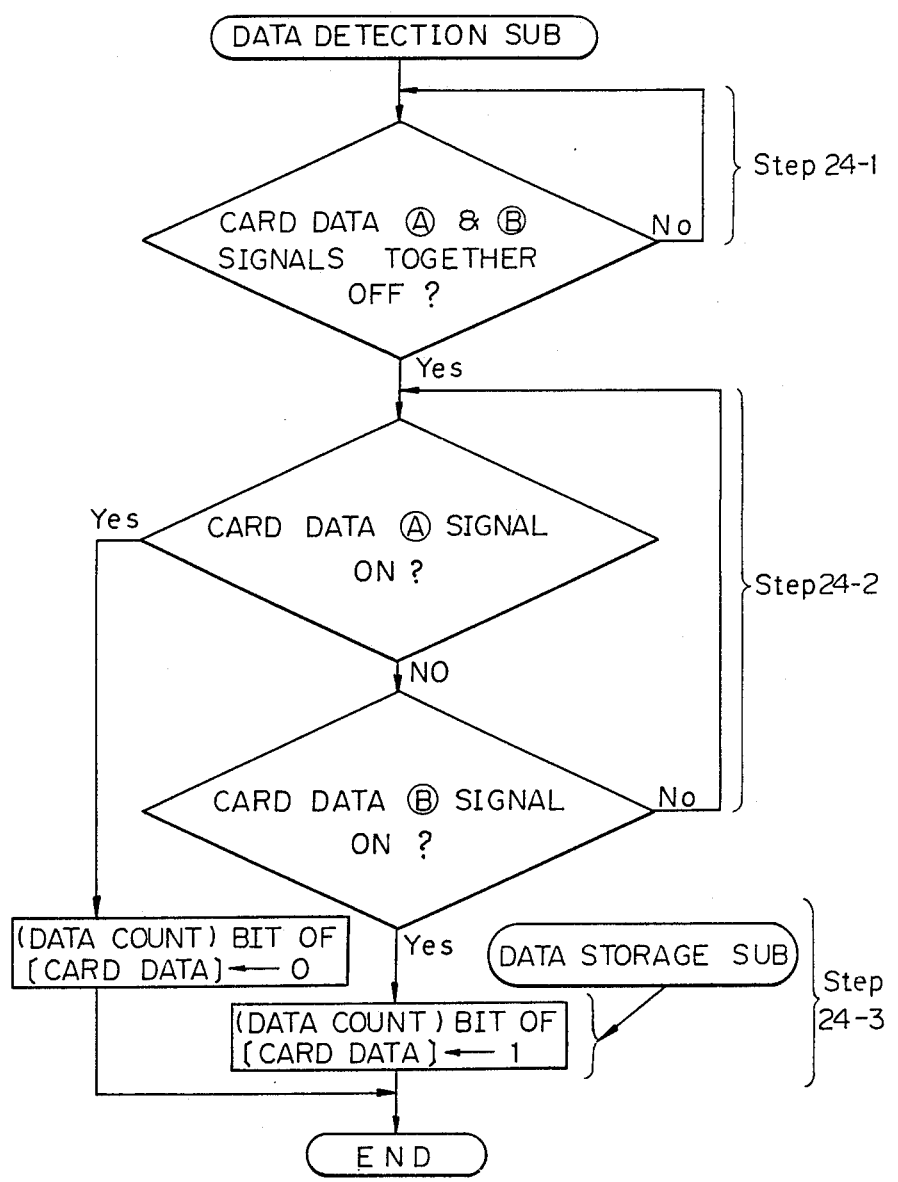

FIG. 12 is a detailed flow chart of data detection. In step 24-1, a portion of the card with no hole is detected. In step 24-2, it is checked if one of the card data A and B signals is off, i.e., which of the A and B signals corresponds to the hole. In step 24-3, data corresponding to the A signal is set as "0" and that corresponding to the B signal is set as "1" both as [card data]bits corresponding to the contents of the [data counter]. In the case illustrated in FIG. 7, data is 01010110B (86 in decimal notation).

Figure 13A:
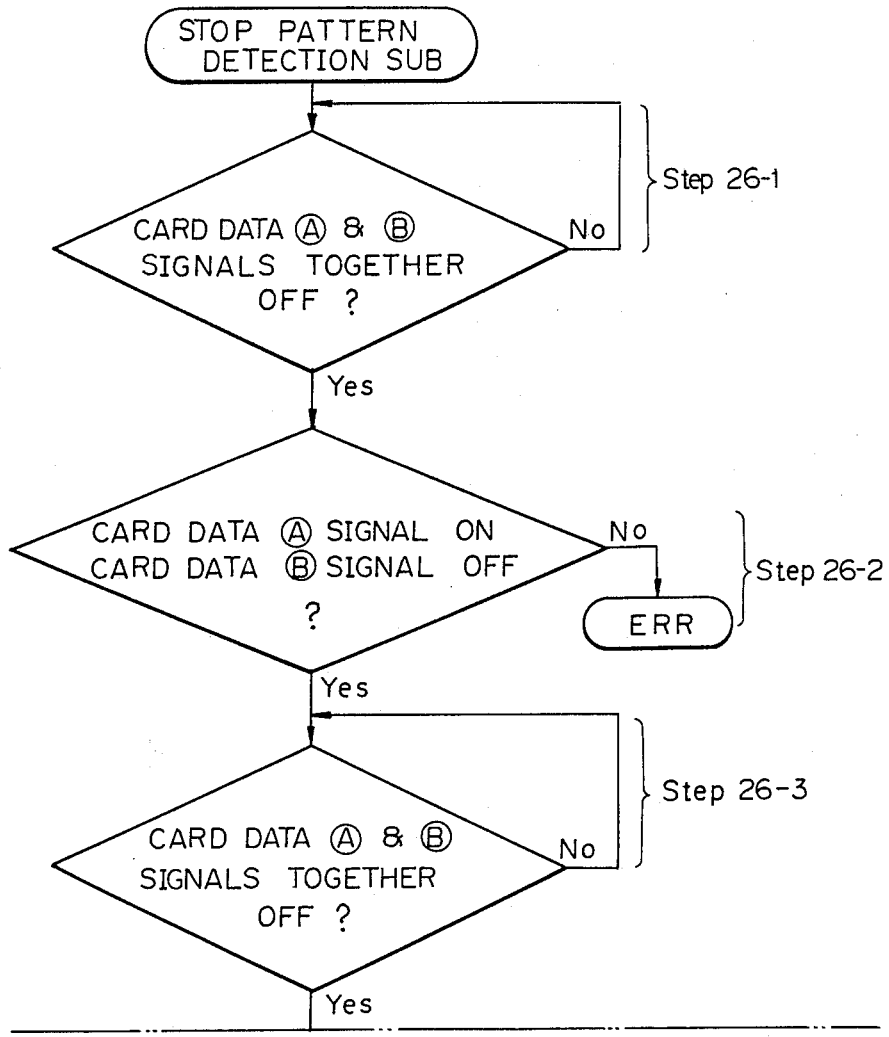
Figure 13B:
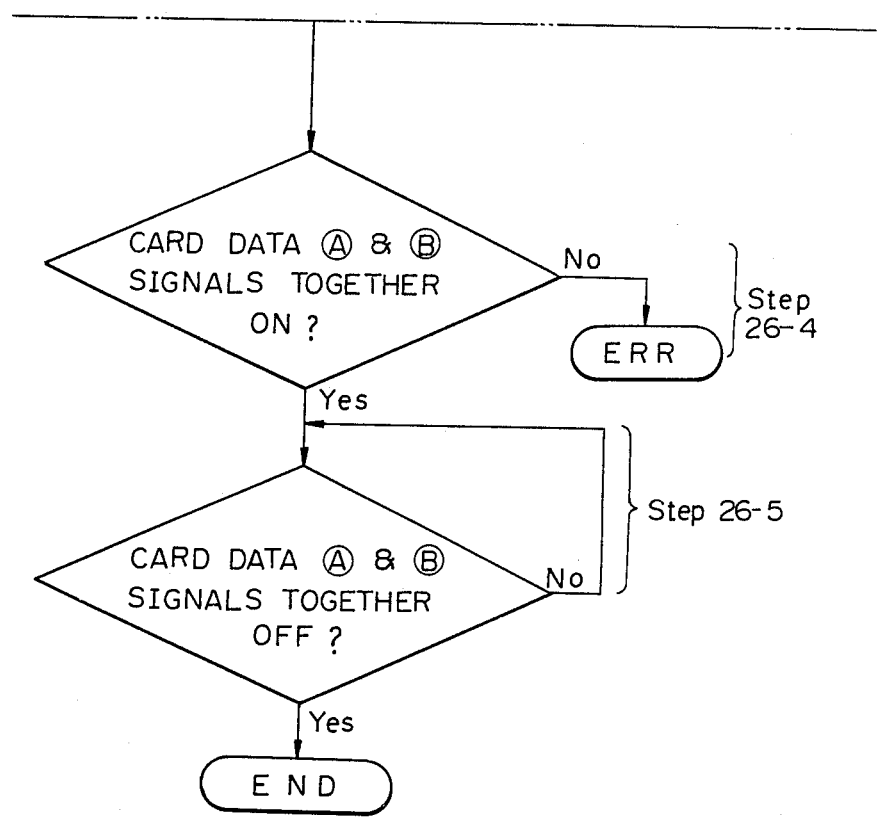

Referring to FIG. 13, a portion of the card with no hole is detected in step 26-1. The hole corresponding to the A signal is detected in step 26-2. A portion of the card with no hole is detected in step 26-3. In step 26-4, holes corresponding to the A and B signals are detected, and a portion with no hole is detected in step 26-5. If other signals are detected in steps 26-2 and 26-4, the stop pattern is not detected and an error is generated.

Processing in each mode will be described below.

Figure 14B:
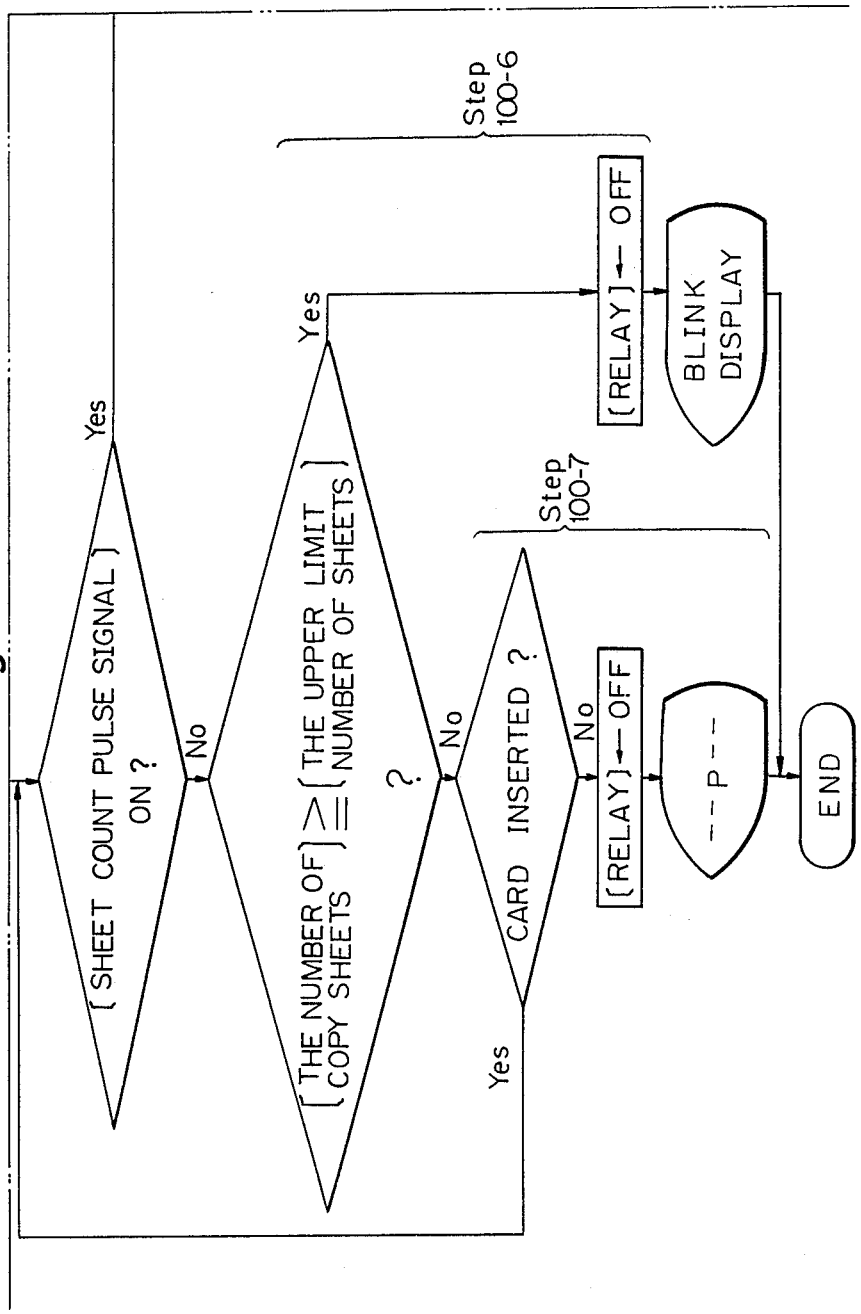
Figure 14C:
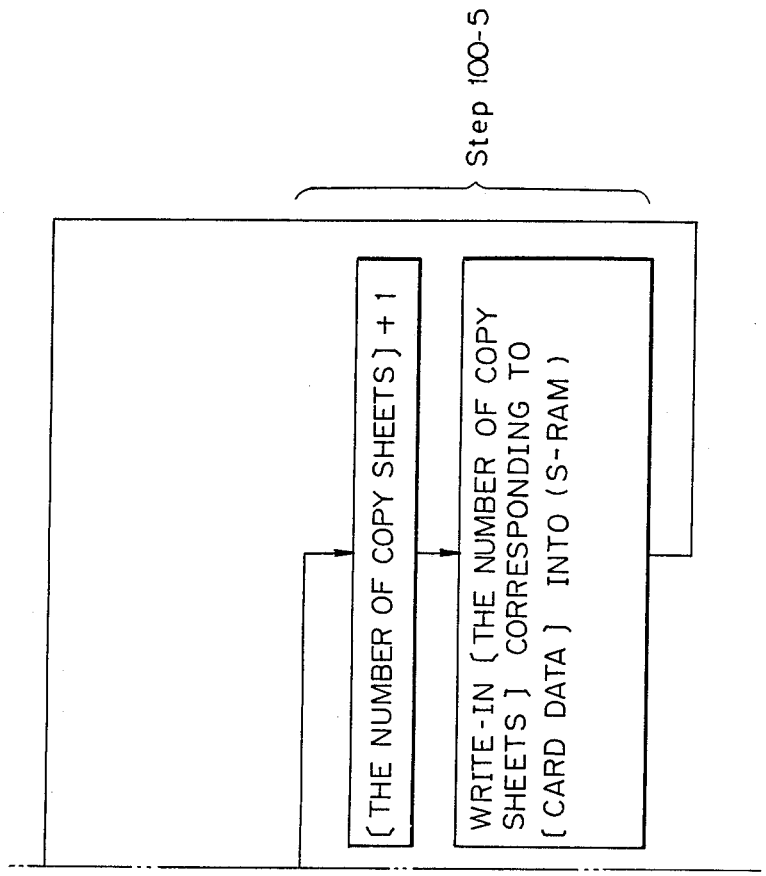

FIG. 14 is a flow chart showing in detail the processing in the section mode.

In this mode, the copy operation can be performed. Every time a copy operation is performed, the number of copy sheets of the section is incremented by one, and the updated number is stored in the RAM in the microcomputer 10.

In step 100-1, the relay coil 27 is turned on by a signal from a terminal 03 of the microcomputer 10 and the contact 26 is turned on to allow the copy operation of the copying machine to be performed. In step 100-2, the marks 7-1 and 7-4 are turned on to indicate marks "#" and "₽". In step 100-3, the card data is used as the section data and [the number of copy sheets] and the upper limit corresponding thereto are read out from the SRAM.

In step 100-4, (the card data), i.e., the section number, and the number of copy sheets of the section are displayed at the display 6. In step 100-5, [the sheet count pulse signal] generated upon each copy operation is monitored. Upon detection of each signal, [the number of copy sheets] is incremented by one and is stored in the SRAM. The flow returns to step 100-4 and updated data is displayed at the display 6.

While no [sheet count pulse signal] is detected, it is checked in step 100-6 if [the number of copy sheets] is equal to or more than [the upper limit]. If YES in step 100-6, the relay coil 27 is turned off, further copy operation is prohibited, and the display on the display 6 is turned off. It is then signalled to the user that the number of copy sheets produced so far has reached the preset upper limit. In step 100-7, it is checked if a card is inserted. When the user pulls the card during copy operation in order to interrupt current copy operation, the relay coil 27 is immediately turned off, and further copy operation is prohibited. A display ["--P--"] is provided on the display 6 to signal to the user that no card is inserted. When the card is pulled before the current copy operation is completed, the current copy operation can be completed first and then the relay coil 27 can be turned off.

Figure 15A:
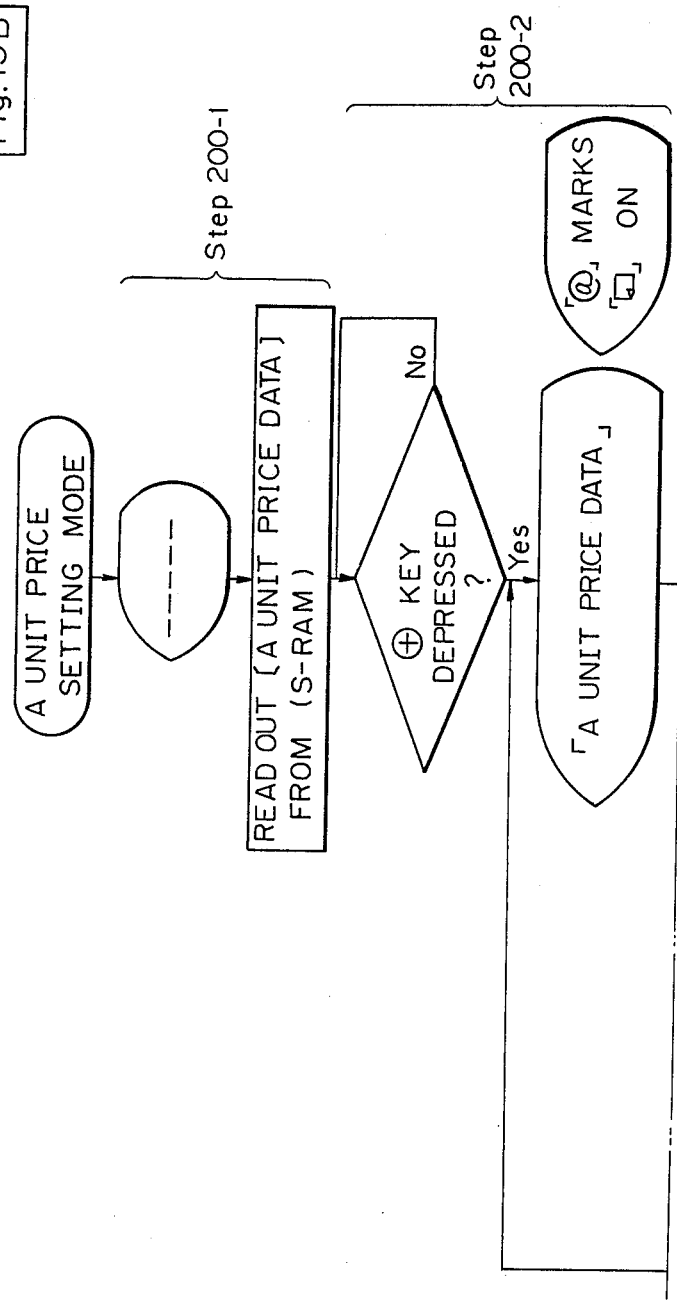
Figure 15B:
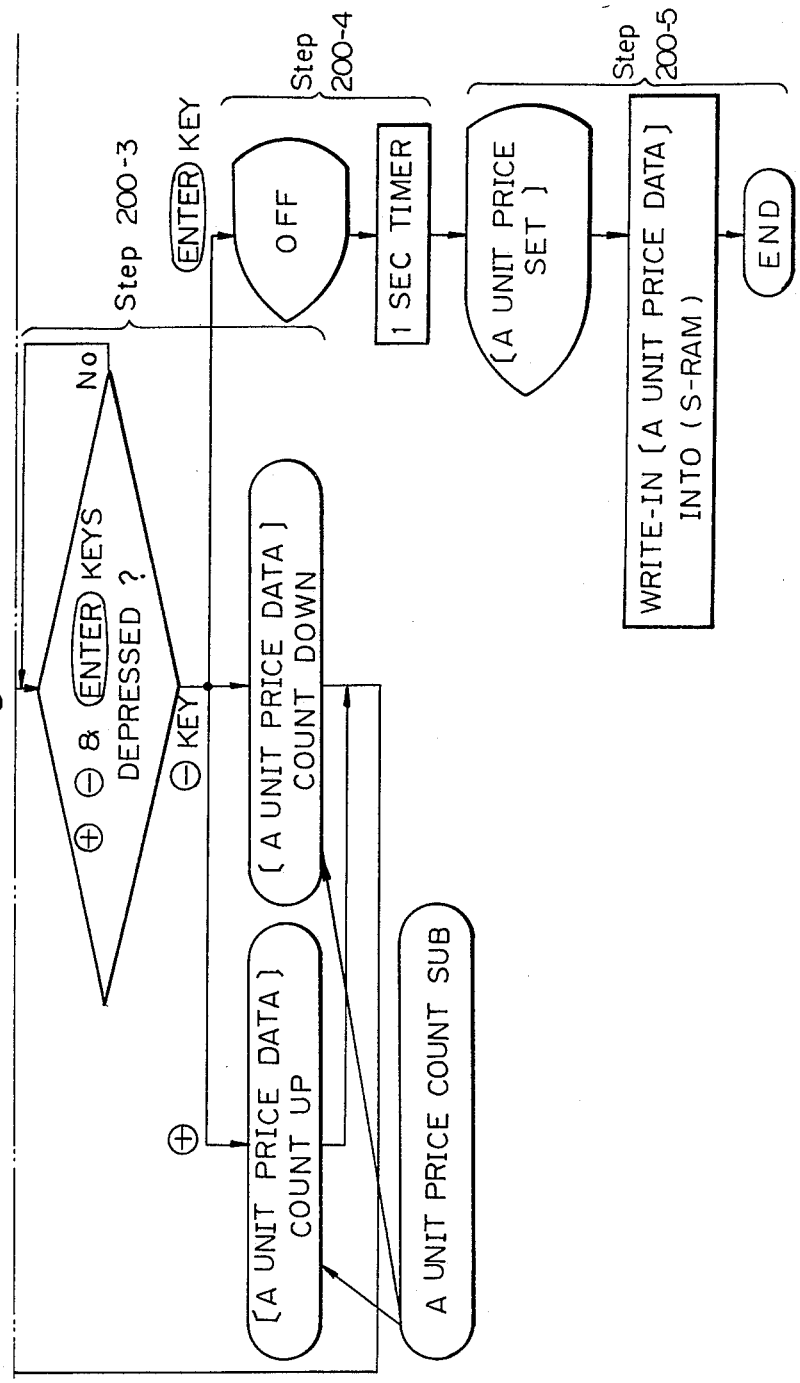
Figure 16:
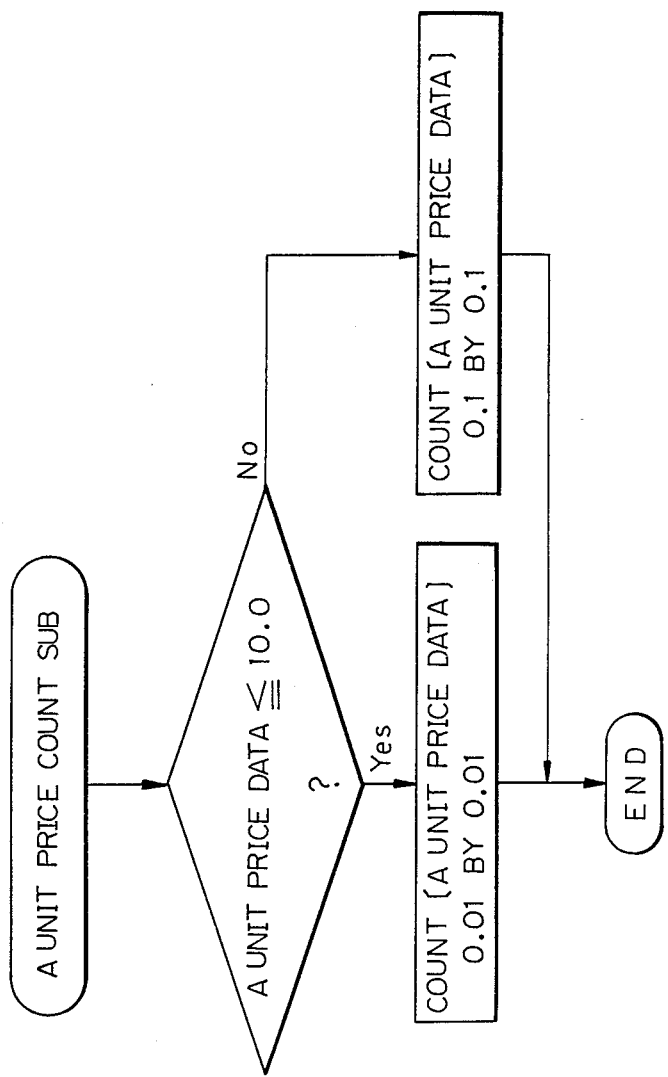

FIGS. 15 and 16 are flow charts showing in detail the processing in the unit price setting mode.

As described above, in the unit price setting mode, the unit price of the copies is set. When the unit price setting card is inserted, the data (201 in this case) of the card is read and the mode is initiated.

Figure 17:
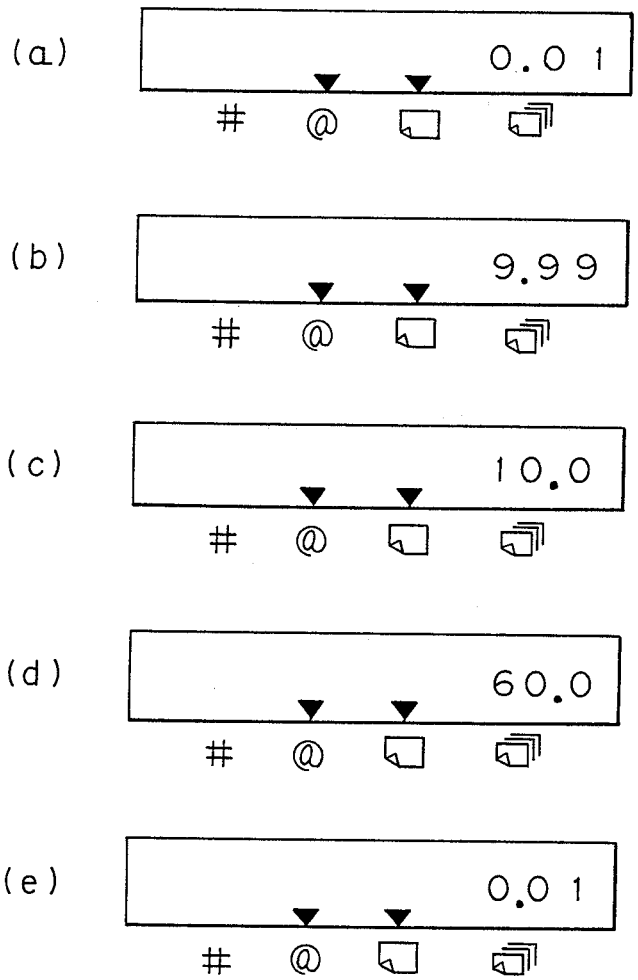
Figure 18B:
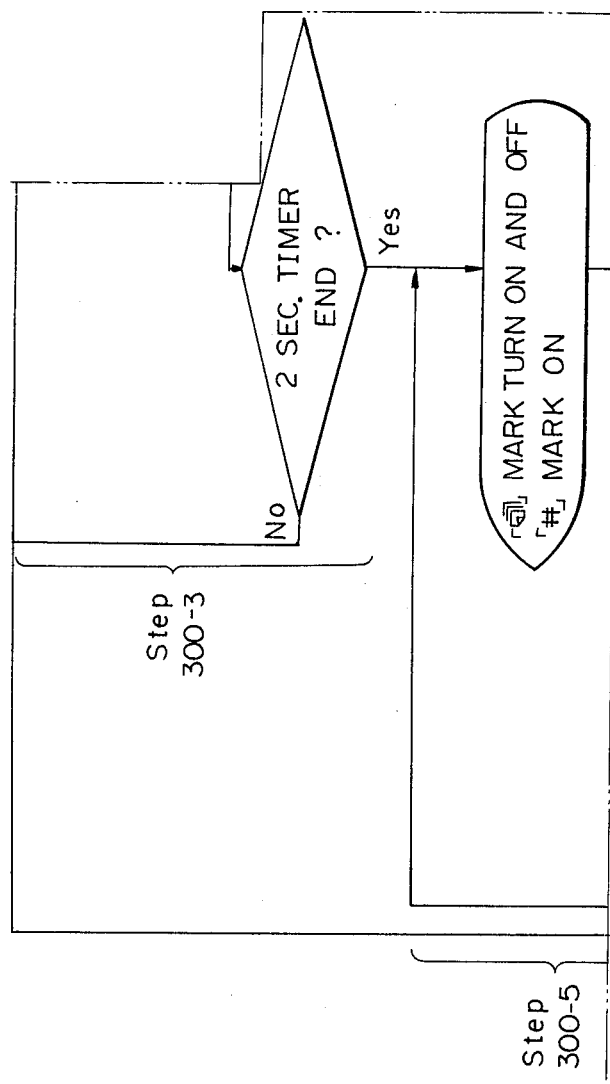
Figure 18C:
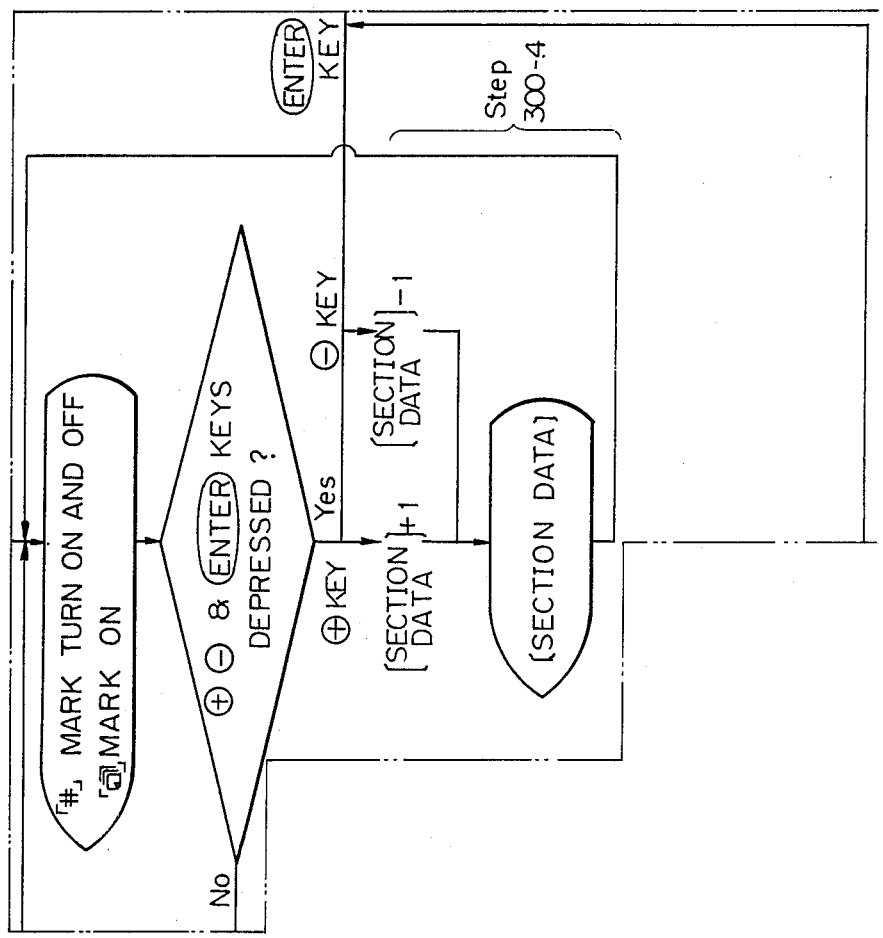
Figure 18D:
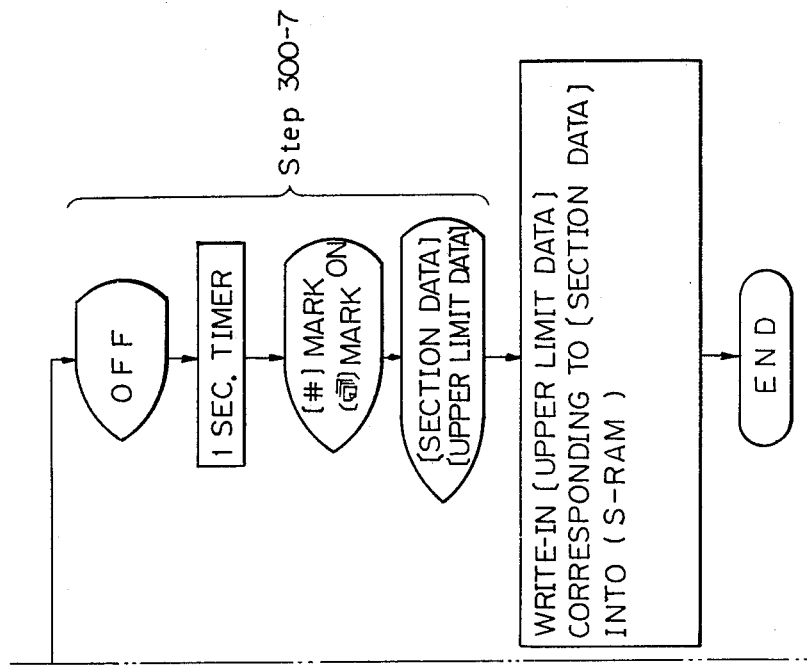
Figure 18E:
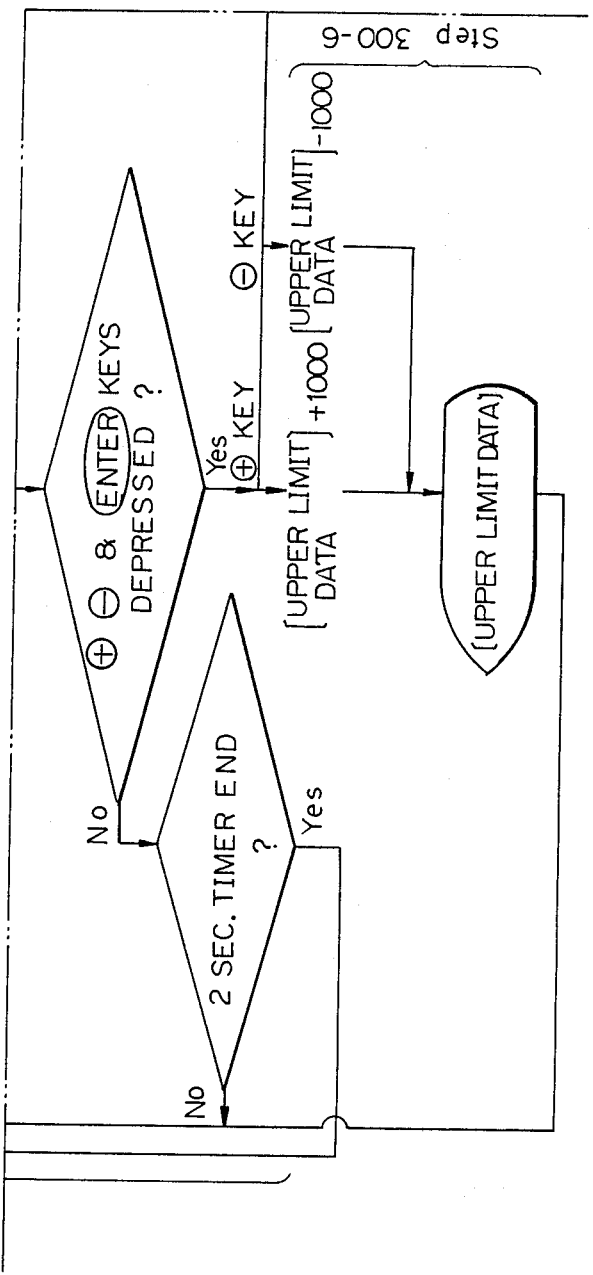

In step 200-1, a display "----" is provided on the display 6, and the unit price setting data is read from the SRAM 11. If no setting data is stored, "0.01" is read. In step 200-2, it is checked if the key 8-1 is depressed. If YES in step 200-2, the marks "@" and "▫" are turned on, and the unit price setting data is set as shown in FIG. 17A. It is checked in step 200-3 if any of the keys 8-1 to 8-3 has been depressed. When it is determined that the key 8-1 is depressed, the unit price data is incremented. However, when it is determined that the key 8-2 is depressed, the unit price data is decremented. FIG. 16 shows the setting sequence. Within a range of 0.01 to 9.99, the unit price is counted in units of 0.01 (FIG. 17B). When the unit price exceeds 9.99+ 0.01, the display unit is switched. In other words, the unit price is now counted in units of 0.1 within a range of 10.0 to 60.0 (FIG. 17D). This switching is utilized to cope with display of the cost or money in foreign currencies. For example, although the minimum display unit required is 0.1 yen in Japan, it is $0.01 for the U.S.A.

When the [ENTER] key 8-2 is depressed, the unit price is set. In steps 200-4 and thereafter, the display is turned off. Data obtained 1 second thereafter is displayed on the display 6 and is stored in the SRAM 11, thereby completing processing in this mode.

This mode is used to set an upper limit on the number of copy sheets which can be produced in a specific section. In particular, the copy operation for a specific section can be prohibited and such prohibition can be released, as needed. When the upper limit setting card is inserted, the data (in this embodiment 202) of the card is read and the upper limit setting mode is started.

In step 300-1, a display "----" is provided on the display 6. At the same time, all upper limit data corresponding to each section data (1 to 200) is read out from the SRAM 11. Initially, maximum values (100,000) are set as upper limits for all sections.

In step 300-2, when it is determined that the key 8-1 or 8-2 is depressed, the [section data] and the [upper limit data] are displayed at the display 6. In step 300-3, the mark 7-1 is flashed to flash the mark "#", and the mark 7-4 is turned on to indicate the mark "₽" (FIG. 19A). This state is sustained for 2 seconds until one of the keys 8-1 to 8-3 is depressed. When the mark 7-1 indicating the mark "#"is flashing, the section mode is selected. In this case, when the key 8-1 is depressed, [section code] is incremented by one (FIG. 19B). When the key 8-2 is depressed, the [section code] is decremented by one (FIG. 19C). This operation is repeated upon each key input (step 300-4). When no key input is performed, after the 20 seconds pass, the flow advances to step 300-5. This time, the mark 7-4 indicating the mark "₽" is flashed, and the mark 7-1 indicating the mark "#is turned on (FIG. 19D). This state is maintained for 2 seconds until a key input is made. After the two seconds, the flow returns to step 300-3. When the mark 7-4 indicating the mark "₽" is flashed, the upper limit setting mode is selected. When the key 8-1 is depressed, the [upper limit data] is incremented by 1,000 (FIG. 19E). When the key 8-2 is depressed, the [upper limit data] is decremented by 1,000 (FIG. 19F). Thereafter, the above operation is repeated upon each key input (step 300-6). At this time, the copy operation by the corresponding section can be prohibited by setting the [upper limit data] to be 0 or less than the current number.

When the [ENTER] 8-3 is depressed, the upper limit data is set. In step 300-7, the display is turned off, after 1 second is updated [section data] and [upper limit data] is displayed at the display 6, and the marks 7-1 and 7-4 for indicating marks "#" and "₽" are turned on. The updated data is stored in the SRAM 11 and the upper limit setting mode ends.

Figure 20:
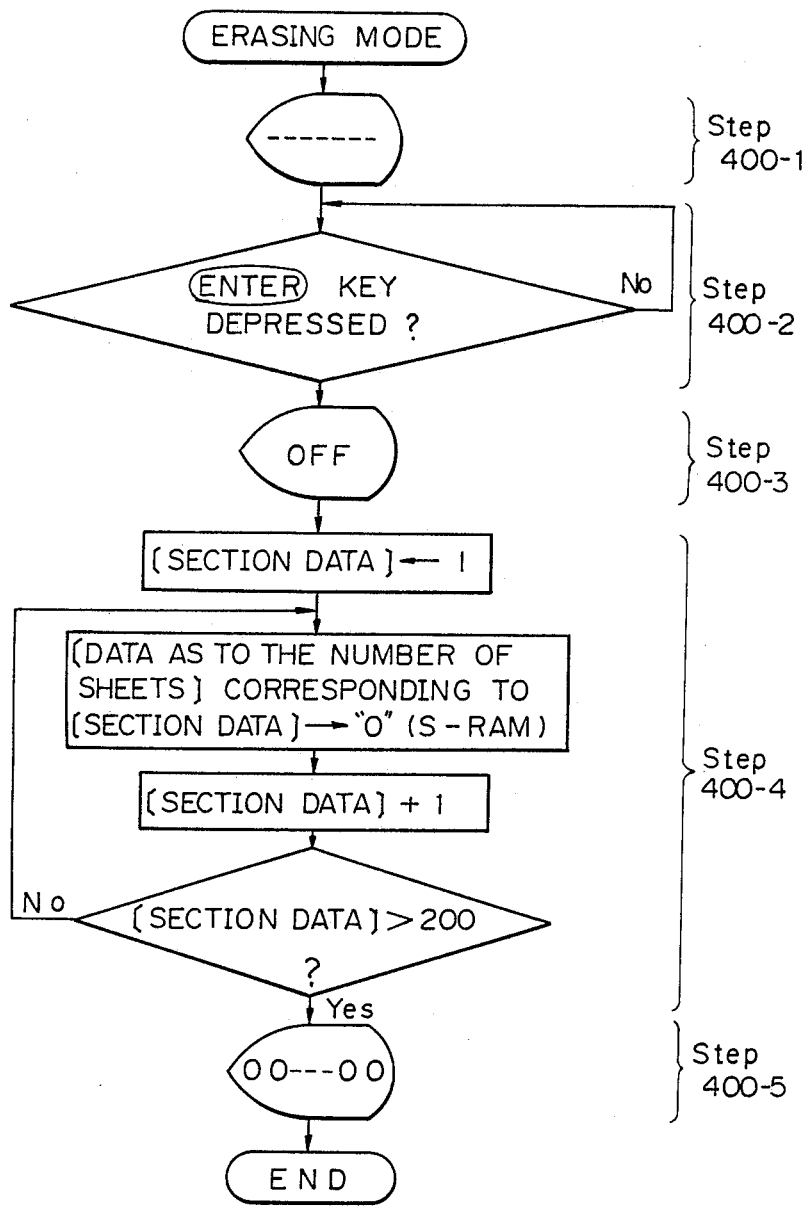

FIG. 20 is a flow chart showing in detail the contents of processing in the erasing mode. In this mode, the data of the number of copy sheets for all sections having codes 1 to 200 stored in the SRAM 11 is cleared to 0.

The data cannot be erased in the upper limit setting mode or the unit price setting mode.

A display "----" is provided on the display 6 (step 400-1). When the [ENTER] 8-3 is depressed (step 400-2), the display is turned off (step 400-3) and processing in the erasing mode is started.

In step 400-4, the data of the number of copy sheets for each of the sections having codes 1 to 200 in the SRAM 11 is sequentially cleared to 0. When this erasing processing is completed, a display "00 . . . 00" is provided on the display 6 so that the user can confirm erasing has been completed. Thus, the data of the number of copy sheets can be easily cleared.

When the erasing of the data is performed by inserting the erasing card, accidental erasure of data by the user is prevented and management reliability is improved.

Figure 21:
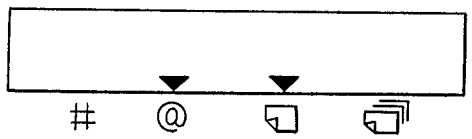
Figure 21:
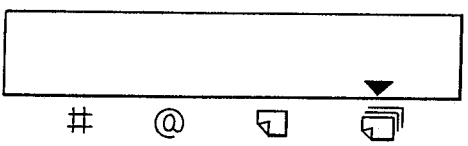
Figure 21:
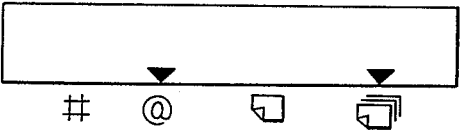
Figure 21:
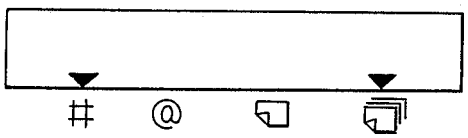
Figure 21:
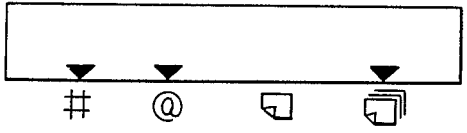
Figure 22B:
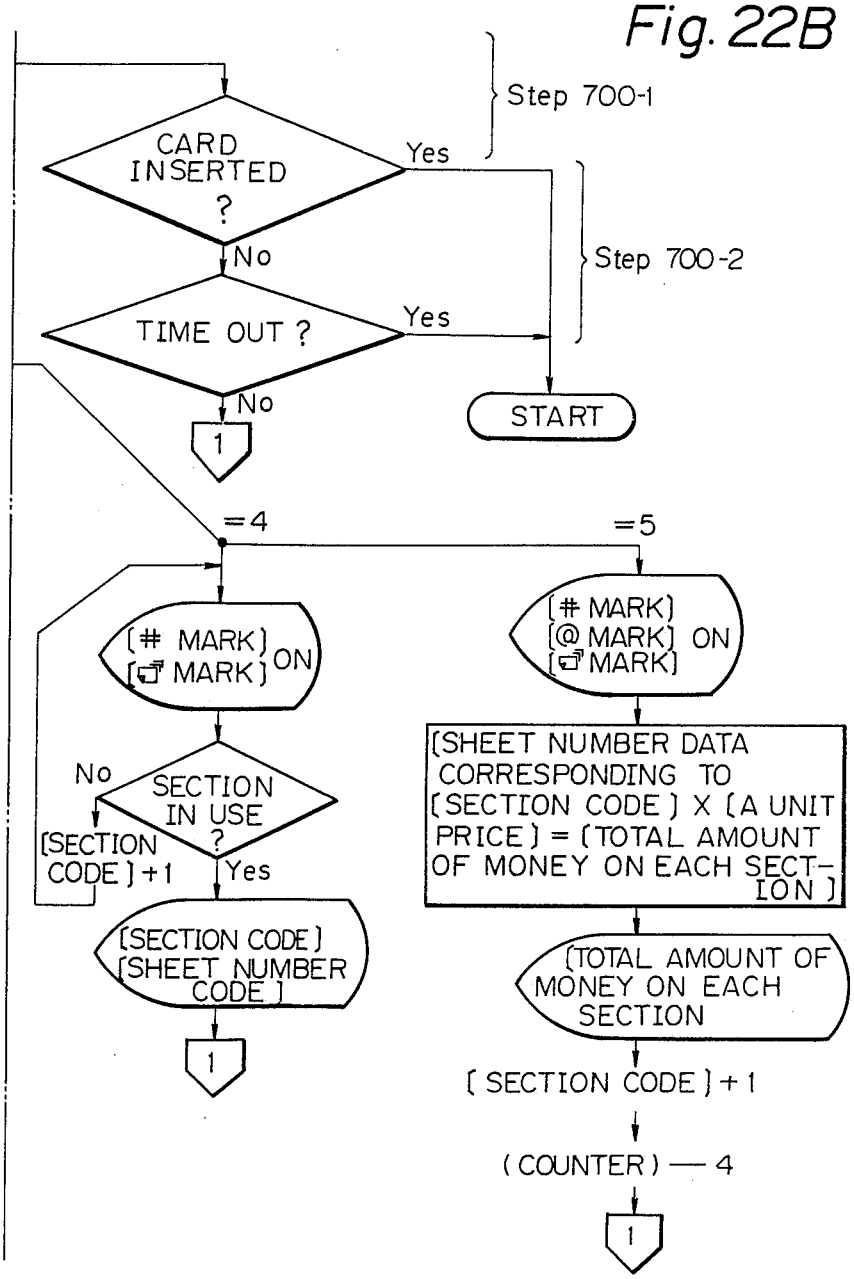

The indication states of the marks 7-1 to 7-4 and the display contents of the display 6 will be described in detail with reference to FIGS. 21 and 22.

FIG. 21A shows an indication when the unit price setting card (FIG. 2C) is inserted. Unit price (@) of copies ▭ indicated, and the value at the display 6 is the unit price.

FIGS. 21B to 21E show indication states when the [ENTER] key 8-3 is depressed when no card is inserted. A description will be provided of the flow chart shown in FIG. 22. When no card is inserted, a display on the display 6 is "--P--". When the [ENTER] key 8-3 is depressed in this state (step 700-1), a display "----" is provided. When the [ENTER] key 8-3 is depressed again, the (counter) is incremented by one, and the display now displays the (total number of copy sheets) of all sections (Fig.21B). When the [ENTER] key 8-3 is depressed another time, the (counter) is incremented by one, and the (total amount of money in all sections) obtained by multiplying the total number of copy sheets by the unit price is indicated as shown in FIG. 21C. When the [ENTER] key 8-3 is depressed still another time, the (counter) is incremented by one, and the section and the corresponding number of copy sheets are indicated as shown in FIG. 21D. In other words, the marks 7-1 and 7-4 indicating the marks "#" (section) and " ₽ " (number of copy sheets) are turned on. When the [ENTER] key 8-3 is depressed still another time, the (counter) is incremented by one, and the indication state as shown in FIG. 21E is obtained. The total amount of money for each section obtained by multiplying the number of copy sheets in each section with the unit price is indicated. Upon subsequent depression of the [ENTER] key 8-3, the counter of the section using the machine is set at 4 and 5 and indication states as shown in FIGS. 21D and 21E are obtained (step 700-3). If a card is inserted during this mode or if the [ENTER] key 8-3 is not depressed before time-out, the display is stopped and the initial state (step 700-2) in FIG. 9 is recovered. The mode is then switched and the display is also switched in accordance with the card data.

The voltage check routine (steps 500 and 600) of the battery 12 for maintaining the contents in the SRAM 11 upon turning off of the machine will be described below.

Figure 23:
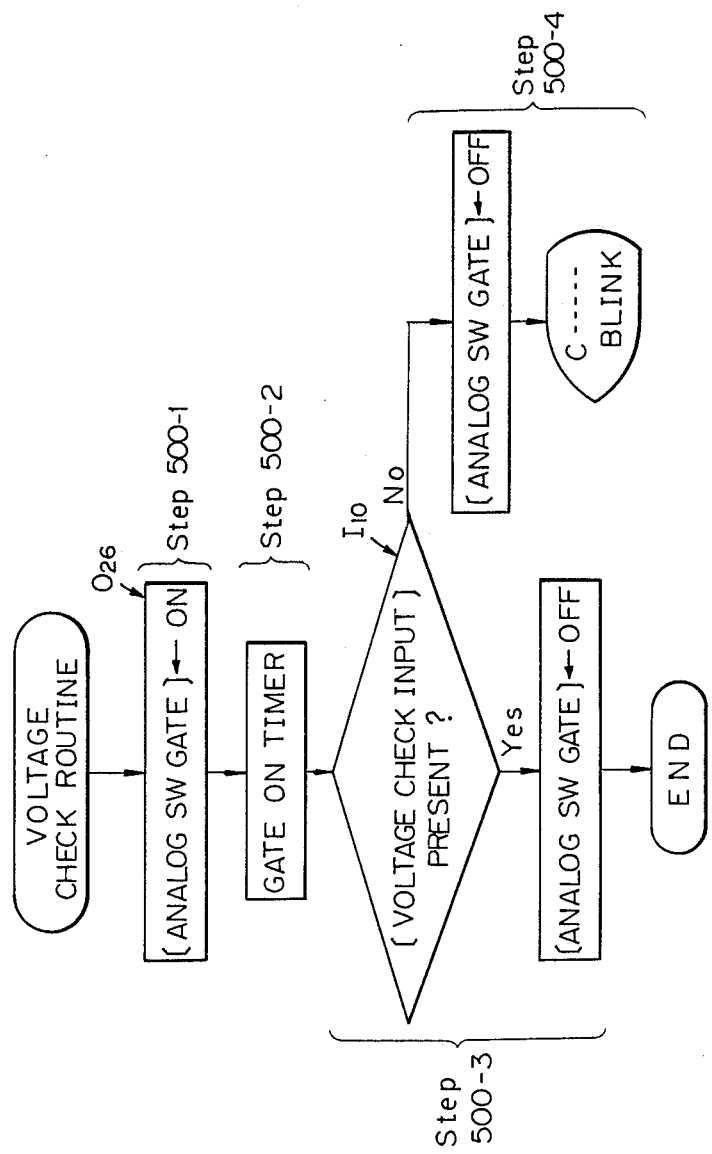

FIG. 23 is a flow chart for voltage check upon turning off of the power source in step 500.

In step 500-1, the analog switch 16 is turned on by a signal from the terminal 026 of the microcomputer 10. In step 500-2, after a [gate on timer] ends, the voltage check is performed by the circuit shown in FIG. 5 after the comparison output of the battery voltage stabilizes. In step 500-3, when it is determined that the voltage is higher than the reference voltage, the [analog switch 16] is turned off and the operation of the equipment is continued (FIG. 11B). However, when it is determined that the voltage is lower than the reference voltage, the analog switch 16 is turned off in step 500-4 so as to prevent the flow of source current. At the same time, a display "C--" is provided on the display 6, and the user is signalled of the need for replacing the battery (FIG. 25A).

Figure 24:
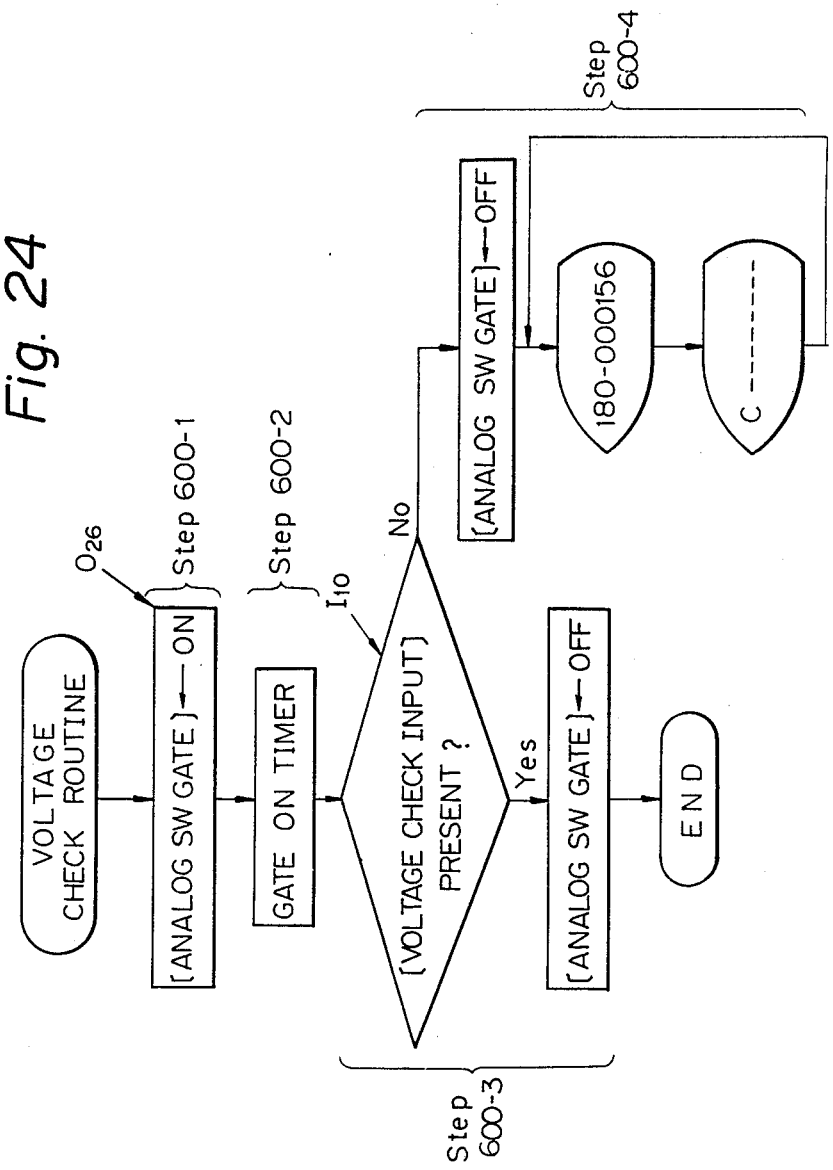
Figure 25:
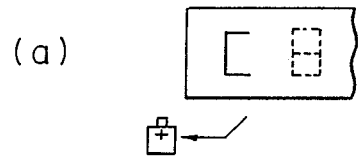
Figure 25:
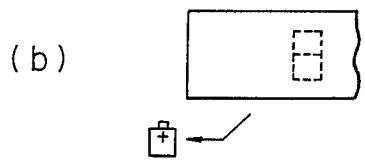
Figure 25:
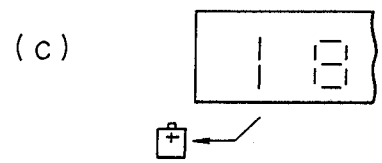
Figure 25:
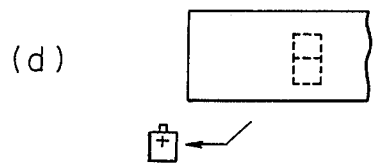
Figure 25:
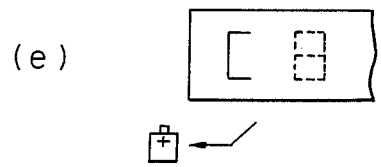

FIG. 24 is a flow chart of the above processing which is executed every time a section card is inserted. First, the presence or absence of a card is checked. At the same time, steps 600-1 to 600-3 the same as steps 500-1 to 500-3 described above are executed. However, when the voltage is lower than the reference voltage, the flow advances to step 600-4. The analog switch 16 is turned off. The section code and "C--" are alternatively indicated as shown in FIG. 25, and the user is signalled of the need for replacing the battery (FIGS. 25C to 25E).

Various timers and counters in the flow charts in the above embodiment are set at predetermined areas in the RAM of the microcomputer 10.

In the above embodiment, the description has been provided of a device and method for managing copy sheets. However, the present invention is not limited to this, and can be applied to various types of management including the management of the number of printed sheets of a printer such as a laser beam printer, the management of communication frequency of communication equipment, and the like.

What is claimed is:

1. A management apparatus for equipment, comprising:
   a recording medium having recorded thereon predetermined information comprising a first pattern and a second pattern, wherein the first pattern and the second pattern are arranged to be sequentially read out so as not to overlap each other;
   first reading means for optically reading the first pattern recorded on said recording medium;
   second reading means for optically reading the second pattern recorded on said recording medium, wherein said first and second means sequentially output signals therefrom; and
   management means for discriminating the information based on combination of the signals which are sequentially outputted from said first and second reading means, and for performing management of the equipment based on the discriminated information.

2. An apparatus according to claim 1, wherein additional information is recorded on the recording medium such that patterns output from said first and second reading means overlap each other.

3. An apparatus according to claim 2, wherein the additional information is start data representing a beginning of section data and stop data representing an end of section data.

4. An apparatus according to claim 1, wherein the predetermined information represents a section which is allowed to use the equipment.

5. A management apparatus for equipment, comprising:
   a recording medium having recorded thereon predetermined function data;
   reading means for reading the data recorded on the recording medium;
   key input means for setting a price per unit amount of use of the equipment;
   first memory means for storing the amount of use of the equipment;
   second memory means for storing a unit price set by said key input means; and
   control means for calculating a total charge of use in accordance with the amount of use of the equipment stored in said first memory means and the unit price stored in said second memory means,
   wherein said control means permits said key input means to set the unit price by identifying the fact that the data read by said reading means is said predetermined function data, and permits said second memory means to store therein the data set by said key input means as the unit price.

6. An apparatus according to claim 5, further comprising display means for displaying the set unit price.

7. An apparatus according to claim 5, wherein said control means allows setting of the unit price in a plurality of setting units.

8. A management apparatus for equipment, comprising:
   a recording medium having recorded thereon predetermined function data;
   reading means for reading the data recorded on the recording medium;
   key input means for entering data representing a price per unit amount of use of the equipment;
   enabling means for enabling said key input means to enter the data representing the unit price by identifying the fact that the data read by said reading means is said predetermined function data; and
   management means for performing management as to the amount of use of the equipment based on the unit price data entered by said key input means,
   wherein said key input means is adapted to set the unit price data in each of a plurality of monetary units.

9. An apparatus according to claim 8, wherein said key input means allows setting of the unit price in a first unit until the unit price reaches a predetermined value and in a second unit thereafter.

10. A management apparatus for equipment, comprising:
    enabling means for enabling the equipment to be operated;
    storage means for storing the amount of accumulated use of the equipment by each section of users of the equipment;
    a recording medium having recorded thereon predetermined function data;
    reading means for reading data recorded on said recording medium;
    input means for entering data representing the upper limit on the amount each section is permitted to use the equipment; and
    control means for discriminating whether data read by said reading means is the predetermined function data, and permitting said input means to set the upper limit in accordance with a discrimination result, wherein said control means controls said enabling means in accordance with both the upper limit and the amount of accumulated use of the equipment stored in said storage means.

11. An apparatus according to claim 10, wherein said recording medium has section information recorded thereon, wherein said control means controls said enabling means to enable the equipment to be operated, by means of reading section information on said recording medium by said reading means.

12. An apparatus according to claim 10, wherein said control means controls said enabling means to disable the equipment from being used, when the amount of accumulated use of the equipment reaches the upper limit.

13. A management apparatus for equipment, comprising:
   a recording medium having recorded thereon predetermined information;
   reading means for reading the information recorded on the recording medium during insertion of the recording medium thereinto;
   management means for performing management of the equipment in accordance with the information read by said reading means; and
   display means for performing a predetermined display in the event that when the power source for the equipment is turned on, said recording medium has already been inserted into said reading means.

14. An apparatus according to claim 13, wherein the information relates to which section is allowed to use the equipment.

15. An apparatus according to claim 14, wherein said management means manages the permissible amount of use of the equipment by each section.

16. A management apparatus for equipment, comprising:
   a recording medium having recorded thereon predetermined data;
   means for reading the data recorded on the recording medium upon setting the recording medium thereto;
   management means for performing management of the equipment based on the data read by said reading means, said management means including memory means for storing management data;
   key input means; and
   display means for displaying the management data, wherein said management means causes the management data to be read out from said memory means in response to an input from said key input means and be displayed on said display means, and wherein said management means causes said display means to change the data displayed to a predetermined display, if said recording medium is set during the display of said management data.

17. An apparatus according to claim 16, wherein the management data is section data relating to which section is allowed to use the equipment, and wherein said memory means stores the permissible amount of use for each section.

18. An apparatus according to claim 17, wherein said management means permits the use of the equipment in accordance with the section data, and wherein said memory means stores the amount of use accumulated by each section of the equipment.

19. An apparatus according to claim 16, wherein the management data is function data for setting a unit price of the use amount, and said management means permits setting a price per unit amount of use of the equipment, and wherein said management means permits setting of the unit price by means of reading of the function data by said reading means.

20. An apparatus according to claim 16, wherein the management data is function data for erasing data representing the amount of use of the equipment stored in said memory means, and wherein said management means permits erasing of data representing the amount of use by the equipment by means for reading of the function data by said reading means.

21. An apparatus according to claim 16, wherein the management data is function data for setting an upper limit on the amount of use of the equipment, and wherein said management means permits setting of the upper limit of the amount of use by means of reading of the function data by the reading means.

22. A management apparatus according to claim 16 wherein said memory means stores a plurality of data representing the amount of use of the equipment, wherein said key input means changes the plurality of data representing the amount of use of the equipment stored in said memory means and outputs a signal for causing data to be displayed on said display means, and wherein said management means controls said display means so as to change the displayed data to a predetermined display, if said signal is not entered during a predetermined period of time in which the data representing the amount of use of the equipment is displayed.

23. An apparatus according to claim 22, wherein the plurality of data representing the use amount is data representing the amount of use by each section.

24. An apparatus according to claim 22, wherein said display means displays its predetermined display while in a waiting status.

25. A management apparatus for equipment, comprising:
   a recording medium having recorded thereon section information for a plurality of sections of the equipment;
   insertion means into which said recording medium is insertable;
   enabling means for permitting use of the equipment by reading of the section information from said recording medium when inserted into said insertion means;
   memory means for storing data representing the amount of use of the equipment on each said section;
   a back-up power source for holding the data stored in said memory means; and
   control means for intermittently performing a voltage check of said back-up power source for a predetermined period of time,
   wherein said control means performs a voltage check of said back-up power source at the time when a main power source for the equipment is turned on and at the time when said recording medium is inserted into said insertion means.

26. An apparatus according to claim 25, wherein when the voltage of said back-up power source is less than a predetermined value, said control means stops the operation of the equipment and displays data indicating that the voltage of said back-up power source is less than the predetermined value.

27. An apparatus according to claim 10, further comprising:
   display means for displaying section data and the upper limit data; and indicating means for indicating, at different predetermined time intervals, which one of the section data and the upper limit data displayed on said display means can be changed when the upper limit is set.

28. An apparatus according to claim 27, wherein said indicating means indicates by flashing that one of the section data and the upper limit data can be changed.

29. A management apparatus for equipment, comprising:
   memory means for storing a plurality of management data for the equipment;
   display means for displaying the management data stored in said memory means;
   key input means;
   control means, responsive to an input from said key input means, for controlling said memory means to sequentially read out one of said plurality of data from said memory means and for controlling said display means to display said one of said plurality of data;
   a plurality of mark members for identifying the type of management data displayed by said display means; and
   indicating means for indicating a predetermined one of said plurality of mark members in accordance with the input from said key input means.

30. An apparatus according to claim 29, wherein the management data includes an amount of use of the equipment by each section, an upper limit on the amount of use of the equipment, and a unit price for each use of the equipment.

31. A management apparatus for equipment, comprising:
   management means for electrically storing data representing the amount of use of the equipment; and
   connecting means for transmitting a signal representing the amount of use of the equipment from a connection portion of the equipment to said management means by means of coupling with said connection portion of the equipment,
   wherein the connecting means is also adapted to be connected to a management means for mechanically storing data representing the amount of use of the equipment.

* * * * *

UNITED STATES PATENT AND TRADEMARK OFFICE
CERTIFICATE OF CORRECTION

PATENT NO. : 4,870,589

DATED : September 26, 1989

INVENTOR(S) : NAOMI TAKAHATA ET AL.   Page 1 of 2

It is certified that error appears in the above-identified patent and that said Letters Patent is hereby corrected as shown below:

ON TITLE PAGE:

AT [56]

Foreign Patent Documents,
        "142399  6/1980  Fed. Rep. of Germany...371/66"
        should read
        --142399  6/1980  Dem. Rep. of Germany...371/66--.

U.S. Patent Documents,
        "3,977,873  12/1976  Thornton...355/6" should read
        --3,997,873  12/1976  Thornton...355/6--.

COLUMN 3

Line 57, "types" should read --types of--.

COLUMN 4

Line 45, "are" should be deleted.

UNITED STATES PATENT AND TRADEMARK OFFICE
CERTIFICATE OF CORRECTION

PATENT NO. : 4,870,589

DATED : September 26, 1989

INVENTOR(S) : NAOMI TAKAHATA ET AL.          Page 2 of 2

It is certified that error appears in the above-identified patent and that said Letters Patent is hereby corrected as shown below:

COLUMN 14

Line 16, "claim 16" should read --claim 16,--.

Signed and Sealed this

Fifteenth Day of September, 1992

Attest:

DOUGLAS B. COMER

Attesting Officer          Acting Commissioner of Patents and Trademarks